(12) United States Patent  
Saka

(10) Patent No.: US 10,897,550 B2  
(45) Date of Patent: Jan. 19, 2021

(54) MEDIUM TRANSPORTING APPARATUS AND IMAGE READING APPARATUS

(71) Applicant: SEIKO EPSON CORPORATION, Tokyo (JP)

(72) Inventor: Yoshihisa Saka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/824,018

(22) Filed: Mar. 19, 2020

(65) Prior Publication Data

US 2020/0304668 A1 Sep. 24, 2020

(30) Foreign Application Priority Data

Mar. 22, 2019 (JP) ................. 2019-054304

(51) Int. Cl.
| | |
|---|---|
| *H04N 1/04* | (2006.01) |
| *H04N 1/00* | (2006.01) |
| *B65H 5/06* | (2006.01) |
| *B65H 29/58* | (2006.01) |

(52) U.S. Cl.
CPC ......... *H04N 1/00734* (2013.01); *B65H 5/062* (2013.01); *B65H 29/58* (2013.01); *H04N 1/00602* (2013.01); *H04N 1/00702* (2013.01)

(58) Field of Classification Search
CPC ........... H04N 1/00734; H04N 1/00602; H04N 1/00702; H04N 1/00575; B65H 5/062; B65H 29/58

USPC ................................. 358/498, 488
See application file for complete search history.

(56) References Cited

U.S. PATENT DOCUMENTS

| | | | | |
|---|---|---|---|---|
| 7,431,282 | B2* | 10/2008 | Ohama | ................ B65H 15/00 |
| | | | | 271/186 |
| 2002/0030321 | A1* | 3/2002 | Sugiyama | .......... H04N 1/00578 |
| | | | | 271/226 |
| 2013/0293909 | A1* | 11/2013 | Endo | ................. H04N 1/00572 |
| | | | | 358/1.12 |

FOREIGN PATENT DOCUMENTS

| | | |
|---|---|---|
| JP | 2003-002546 A | 1/2003 |
| JP | 2006-213457 A | 8/2006 |

\* cited by examiner

*Primary Examiner* — Cheukfan Lee
(74) *Attorney, Agent, or Firm* — Workman Nydegger

(57) ABSTRACT

A medium transporting apparatus includes a first medium transport path in which a transport roller pair is provided, a second medium transport path for feeding a medium fed downstream in a medium transport direction from the transport roller pair to an upstream position of the transport roller pair in the first medium transport path, and a medium detection unit for detecting passage of a medium in the first medium transport path, in which a position at which the medium detection unit detects a medium is switched between a transport direction upstream position and a transport direction downstream position of the transport roller pair according to whether or not a medium is transported on the second medium transport path.

10 Claims, 14 Drawing Sheets

MEDIUM TRANSPORTING APPARATUS AND IMAGE READING APPARATUS

The present application is based on, and claims priority from JP Application Ser. No. 2019-054304, filed Mar. 22, 2019, the disclosure of which is hereby incorporated by reference herein in its entirety.

BACKGROUND

1. Technical Field

The present disclosure relates to a medium transporting apparatus configured to transport a medium and an image reading apparatus provided with the medium transporting apparatus.

2. Related Art

In an image reading apparatus such as a scanner and a facsimile, a sensor for detecting passage of a medium is provided in a medium transport path for transporting the medium.

In an automatic document feeder described in JP-A-2003-002546, a reading inlet roller for feeding a document is provided upstream of a reading section, a reading inlet sensor is provided upstream of the reading inlet roller, and a resist sensor is provided downstream of the reading inlet roller. Then, a document front end is detected by the respective sensors, and predetermined control is performed.

In the following, the reading inlet roller will be referred to as a "document feed roller", the reading inlet sensor will be referred to as an "upstream sensor", and the resist sensor will be referred to as a "downstream sensor".

An advantage of providing the upstream sensor includes that when a document feed roller corrects inclination of the document, an amount of deflection of the document can be more accurately managed. In particular, when feeding a document to the document feed roller again via a reversing path, after reading a first surface of the document, in order to read a second surface opposite thereto, a front end position of the document is hard to be managed because a path length for reversing the document becomes longer, so that a document deflection amount at the time of inclination correction can be more appropriately managed with the upstream sensor being provided in such a case.

Further, an advantage of providing a downstream sensor includes that a reading start position can be more accurately managed by grasping the document front end position at a position closer to the reading section.

In this manner, both the upstream sensor and the downstream sensor may be provided as a sensor for detecting the document, which leads to an increase in cost.

SUMMARY

A medium transporting apparatus configured to solve the above issue includes a transport roller pair for nipping and transporting a medium, a first medium transport path in which the transport roller pair is provided, a second medium transport path for switching back a medium fed downstream in a medium transport direction from the transport roller pair and feeding the medium with a rear end as a front end to an upstream position of the transport roller pair in the first medium transport path, and a medium detection unit for detecting passage of a medium in the first medium transport path, in which the medium detection unit includes a first rotating portion having a first contact portion configured to make contact with a medium in the first medium transport path and rotating along with contact of a medium with the first contact portion and separation of a medium from the first contact portion, a second rotating portion having a second contact portion configured to make contact with a medium in the second medium transport path and rotating along with contact of a medium with the second contact portion and separation of a medium from the second contact portion, and a detection portion for detecting a detection target portion provided at the first rotating portion, and the first rotating portion is configured to make contact with the second rotating portion and is switched, by rotating according to rotation of the second rotating portion, between a first detection posture in which the first contact portion protrudes to the first medium transport path at a first position of the first medium transport path and a second detection posture in which the first contact portion protrudes to the first medium transport path at a second position downstream of the first position in a medium transport direction.

DESCRIPTION OF EXEMPLARY EMBODIMENTS

Figure 1:
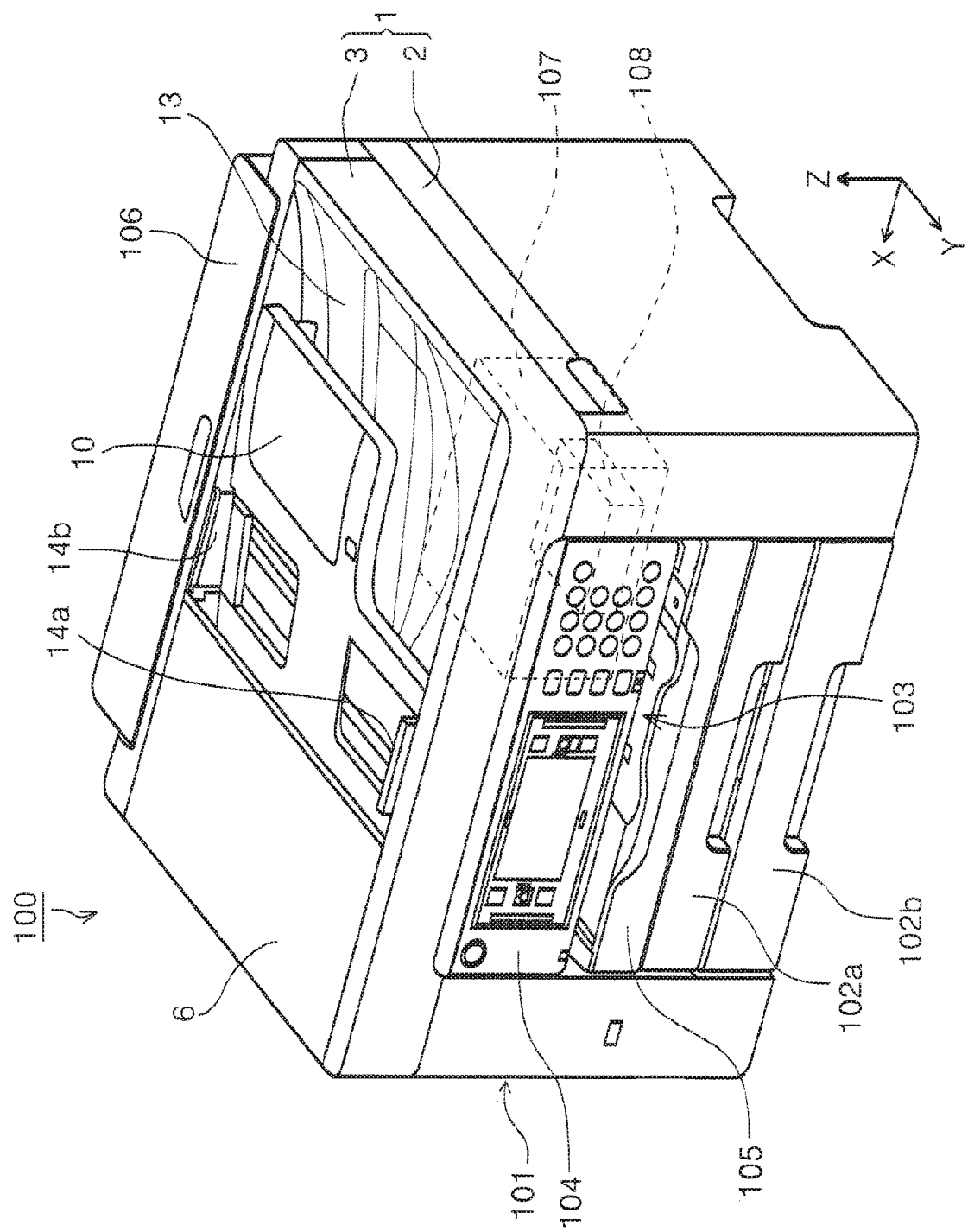
FIG. 1 is an external perspective view of a printer.

The present disclosure will now be described in brief.

A medium transporting apparatus according to a first aspect includes a transport roller pair for nipping and transporting a medium, a first medium transport path in which the transport roller pair is provided, a second medium transport path for switching back a medium fed downstream in a medium transport direction from the transport roller pair and feeding the medium with a rear end as a front end to an upstream position of the transport roller pair in the first medium transport path, and a medium detection unit for detecting passage of a medium in the first medium transport path, in which the medium detection unit includes a first rotating portion having a first contact portion configured to make contact with a medium in the first medium transport path and rotating along with contact of a medium with the first contact portion and separation of a medium from the first contact portion, a second rotating portion having a second contact portion configured to make contact with a medium in the second medium transport path and rotating along with contact of a medium with the second contact portion and separation of a medium from the second contact portion, and a detection portion for detecting a detection target portion provided at the first rotating portion, and the first rotating portion is configured to make contact with the second rotating portion and is switched, by rotating according to rotation of the second rotating portion, between a first detection posture in which the first contact portion protrudes to the first medium transport path at a first position of the first medium transport path and a second detection posture in which the first contact portion protrudes to the first medium transport path at a second position downstream of the first position in a medium transport direction.

According to this aspect, since the first contact portion included in the first rotating portion is configured to take the first detection posture in which the first contact portion protrudes to the first medium transport path at the first position of the first medium transport path and the second detection posture in which the first contact portion protrudes to the first medium transport path at the second position downstream in the medium transport direction from the first position, a medium can be detected at two positions in the first medium transport path by the one first contact portion, and it is possible to suppress the cost increase in comparison with a configuration in which two detection units are individually provided.

In a second aspect, in addition to the first aspect, the first position is located at a medium transport direction upstream position of a medium nip position in the transport roller pair, and the second position is located at a medium transport direction downstream position of the medium nip position.

According to this aspect, since the first position is located at the medium transport direction upstream position of the medium nip position in the transport roller pair, and the second position is located at the medium transport direction downstream position of the medium nip position, when the first rotating portion is in the first detection posture, it is possible to appropriately manage a deflection amount formed on a medium when skew correction of a medium is performed by the transport roller pair. Further, when the first rotating portion is in the second detection posture, a medium can be accurately positioned at a predetermined position downstream of the transport roller pair in the medium transport direction.

According to a third aspect, in the first or the second aspect, the first rotating portion is configured to rotate in a first rotation direction that is a rotation direction when switching from the second detection posture to the first detection posture and in a second rotation direction opposite to the first rotation direction, and be applied with a force to rotate in the first rotation direction, the second rotating portion is configured to rotate in a third rotation direction that is a rotation direction when the second contact portion protrudes from a state of retracting with respect to the second medium transport path and a fourth rotation direction that is a rotation direction when the second contact portion retracts from a state of protruding with respect to the second medium transport path, and be applied with a force to rotate in the third rotation direction, and the second rotating portion is configured to take a first state which maintains the first rotating portion in the second detection posture and also allows rotation of the first rotating portion in the second rotation direction in a state in which the second contact portion protrudes to the second medium transport path and a medium is not in contact with the first contact portion, and a second state which allows the first rotating portion to take the first detection posture and also allows rotation of the first rotating portion in the second rotation direction in a state in which the second contact portion retracts from the second medium transport path by rotating in the fourth rotation direction from the first state and a medium is not in contact with the first contact portion.

According to this aspect, functions of the first aspect can be realized with a simple structure by applying a force to rotate in the first rotation direction to the first rotating portion and applying a force to rotate in the second rotation direction to the second rotating portion.

According to a fourth aspect, in the third aspect, the detection portion is configured by an optical sensor, the detection target portion switches, along with rotation of the first rotating portion, among a light shielding state in which the detection target portion blocks an optical axis of the optical sensor, a first open state in which the detection target portion deviates from the optical axis to a first direction, and a second open state in which the detection target portion deviates from the optical axis to a second direction, the detection target portion is in the light shielding state while the second rotating portion is in the first state and the first rotating portion is in the second detection posture, the first rotating portion in the second detection posture rotates in the second rotation direction, whereby the detection target portion is switched from the light shielding state to the first open state, the detection target portion is in the second open state while the second rotating portion is in the second state and the first rotating portion is in the first detection posture, and the first rotating portion in the first detection posture rotates in the second rotation direction, whereby the detection target portion is switched from the second open state to the light shielding state.

According to this aspect, since the detection target portion is switched, along with rotation of the first rotating portion, among the light shielding state in which the detection target portion blocks the optical axis of the optical sensor, the first open state in which the detection target portion deviates from the optical axis to the first direction, and the second open state in which the detection target portion deviates from the optical axis to the second direction, the medium can be appropriately detected by recognizing change in the state of the detection target portion.

According to a fifth aspect, in the fourth aspect, the medium transporting apparatus further includes a control portion configured to receive a detection signal from the optical sensor, in which in a feed standby state of a medium, the second rotating portion is in the first state and the first rotating portion is in the second detection posture, and the detection target portion is in the light shielding state, next, when feeding of a medium is started, a front end of a medium comes into contact with the first contact portion and the first rotating portion is switched from the second detection posture to a third detection posture in which the first contact portion retracts from the first medium transport path, therefore the detection target portion is switched from the light shielding state to the first open state along with this, next, when a rear end of a medium is separated from the first contact portion, the first rotating portion returns from the third detection posture to the second detection posture, therefore the detection target portion is switched from the first open state to the light shielding state along with this, next, when a front end of a medium entering the second medium transport path comes into contact with the second contact portion and the second rotating portion is switched from the first state to the second state, the first rotating portion is switched from the second detection posture to the first detection posture, therefore the detection target portion is switched from the light shielding state to the second open state along with this, and next, when a front end of a medium entering the first medium transport path from the second medium transport path comes into contact with the first contact portion and the first rotating portion rotates in the second rotation direction from the first detection posture, therefore the detection target portion is switched from the second open state to the light shielding state along with this.

According to this aspect, when the front end of the medium firstly comes into contact with the first contact portion, since the first rotating portion is in the second detection posture, the medium can be accurately positioned at a predetermined position downstream in the medium transport direction of the first contact portion.

Further, after that, when the medium passes through the second medium transport path and enters the first medium transport path again, the path length of the medium, that is, the length of the path through which the medium has passed is likely to be long, and the front end position of the medium is hard to be managed, so that it is hard to appropriately manage the deflection amount formed on the medium when the skew correction of the medium is performed by the transport roller pair. However, in this case, since the first rotating portion is in the first detection posture, the front end position of the medium can be more accurately grasped at an upstream direction of the transport roller pair, and thus, the deflection amount formed on the medium can be more appropriately managed when the skew correction of the medium is performed by the transport roller pair.

According to a sixth aspect, in the third to fifth aspects, the medium transporting apparatus further includes a first spring for applying a spring force to the first rotating portion in the first rotation direction, and a second spring for applying a spring force to the second rotating portion in the third rotation direction.

According to this aspect, the configuration in which the rotational force is applied to the first rotating portion and the second rotating portion is achieved with a simple structure and at a low cost.

An image reading apparatus according to a seventh aspect includes a reading unit for reading a medium, and the medium transporting apparatus according to any one of the first to sixth aspects.

According to this aspect, the same effects as those of any one of the first to sixth aspects described above can be obtained in the image reading apparatus.

According to an eighth aspect, in the seventh aspect, a document reading area by the reading unit is positioned downstream in a medium transport direction with respect to the second position of the first contact portion.

Since the document reading area by the reading unit is positioned downstream in the medium transport direction with respect to the second position of the first contact portion, when the first rotating portion is in the second detection posture, the medium can be accurately positioned at the reading position by the reading unit.

A medium transporting apparatus according to a ninth aspect includes a transport roller pair for nipping and transporting a medium, a first medium transport path provided with the transport roller pair, a second medium transport path for switching-back a medium fed downstream from the transport roller pair in a medium transport direction, and then, feeding the medium to an upstream position of the transport roller pair in the first transport path by a rear end of the medium as a front end, and one medium detection unit for detecting passage of a medium in the first medium transport path, in which a position at which the medium detection unit detects a medium is switched between a transport direction upstream position and a transport direction downstream position of the transport roller pair according to whether or not a medium is transported on the second medium transport path.

According to a tenth aspect, in the first aspect, the medium detecting unit detects a medium at a downstream position in a transport direction of a medium nip position of the transport roller pair in a state in which a medium is not transported to the second medium transport path, and detects a medium at a transport direction upstream position of a medium nip position of the transport roller pair in a state in which a medium is transported to the second medium transport path.

Hereinafter, the present disclosure will be described in detail.

Note that in the drawings, a direction along an X-axis is an apparatus width direction, a −X direction is a right direction as viewed from a user when a front surface of an apparatus faces the user, and a +X direction is a left direction in the same manner.

In addition, a direction along a Y-axis is an apparatus depth direction, and is a direction intersecting a transport direction of a document in a scanner unit 1, that is, a document width direction. A +Y direction is a direction oriented from a back surface of the apparatus toward a front surface, and a −Y direction is a direction oriented from the front surface of the apparatus toward the back surface.

In addition, a direction along a Z-axis is the vertical direction, a +Z direction is a vertical upward direction, and a −Z direction is a vertical downward direction.

In the present embodiment, a side surface on which an operating portion 104 is provided among side surfaces configuring the circumference of the apparatus is defined as the front surface of the apparatus.

In FIG. 1, an ink jet printer 100, which is an example of a recording apparatus, is a so-called multi-function machine in which the scanner unit 1, which is an example of an image reading apparatus, is provided on an upper portion of a recording unit 101. Hereinafter, an ink jet printer is referred to as a "printer".

The recording unit 101 has a function of performing recording on a recording sheet, and the scanner unit 1 has a function of reading a document which is an example of a medium. The scanner unit 1 includes a main body portion 2 having a document reading function, and an automatic document feeder (ADF) 3 for automatically feeding a set document. Hereinafter, an automatic document feeder will be referred to as an "ADF". The ADF 3 is an example of a medium transporting apparatus.

Note that although the scanner unit 1 in the present embodiment configures the printer 100 as a multi-function machine together with the recording unit 101, naturally, only the scanner unit 1 may be configured alone. In addition, in the present embodiment, the medium transporting apparatus is applied to the image reading apparatus, but may be applied inside the recording unit 101 as a recording apparatus. In this case, the scanner unit 1 may not be provided, and only the recording unit 101 may be configured alone.

The recording unit 101 includes a transport path (not illustrated) for transporting a recording sheet, and a recording head 108, which is an example of a recording unit. The recording head 108 is provided in a carriage 107 that reciprocates in the X-axis direction.

The recording sheet is stored in paper cassettes 102a and 102b, and is transported to a position facing the recording head 108 by a transport unit (not illustrated).

Further, the recording unit 101 is configured to also allow paper to be set and fed from the back surface of the apparatus in addition to the paper to be set to the paper cassettes 102a and 102b. Reference numeral 106 denotes a cover for opening and closing a paper set port (not illustrated) for setting a paper sheet from the back surface of the apparatus.

The recording unit 101 is provided with the operating portion 104 for performing various operations of the printer 100 on the front surface of the apparatus. The operating portion 104 is provided with a display portion and a plurality of operation buttons, and is provided so as to be tiltable.

On a lower side of the operating portion 104, there is provided a discharge tray 105 for receiving a recording sheet that is subjected to recording and discharged. The discharge tray 105 is provided so as to be able to take a state in which it is housed inside the recording unit 101 as illustrated in FIG. 1, and a state in which it is pulled out from the recording unit 101 (not illustrated). The discharge tray 105 is pulled out and thereby to receive the recording sheet discharged from a discharge port 103.

Next, the entire configuration of the scanner unit 1 will be described with reference to FIG. 1 and FIG. 2. Note that in the following description, a direction in which the document is transported will be referred to as "downstream", and the opposite direction will be referred to as "upstream".

As described above, the scanner unit 1 includes the main body portion 2 and the ADF 3. The ADF 3 is provided so as to be able to take a closed posture (FIG. 1) and an opened posture (not illustrated) with respect to the main body portion 2. When providing the ADF 3 in the opened posture, a document table 4A (FIG. 2) on which the document is placed, and which configures the main body portion 2, appears.

Figure 2:
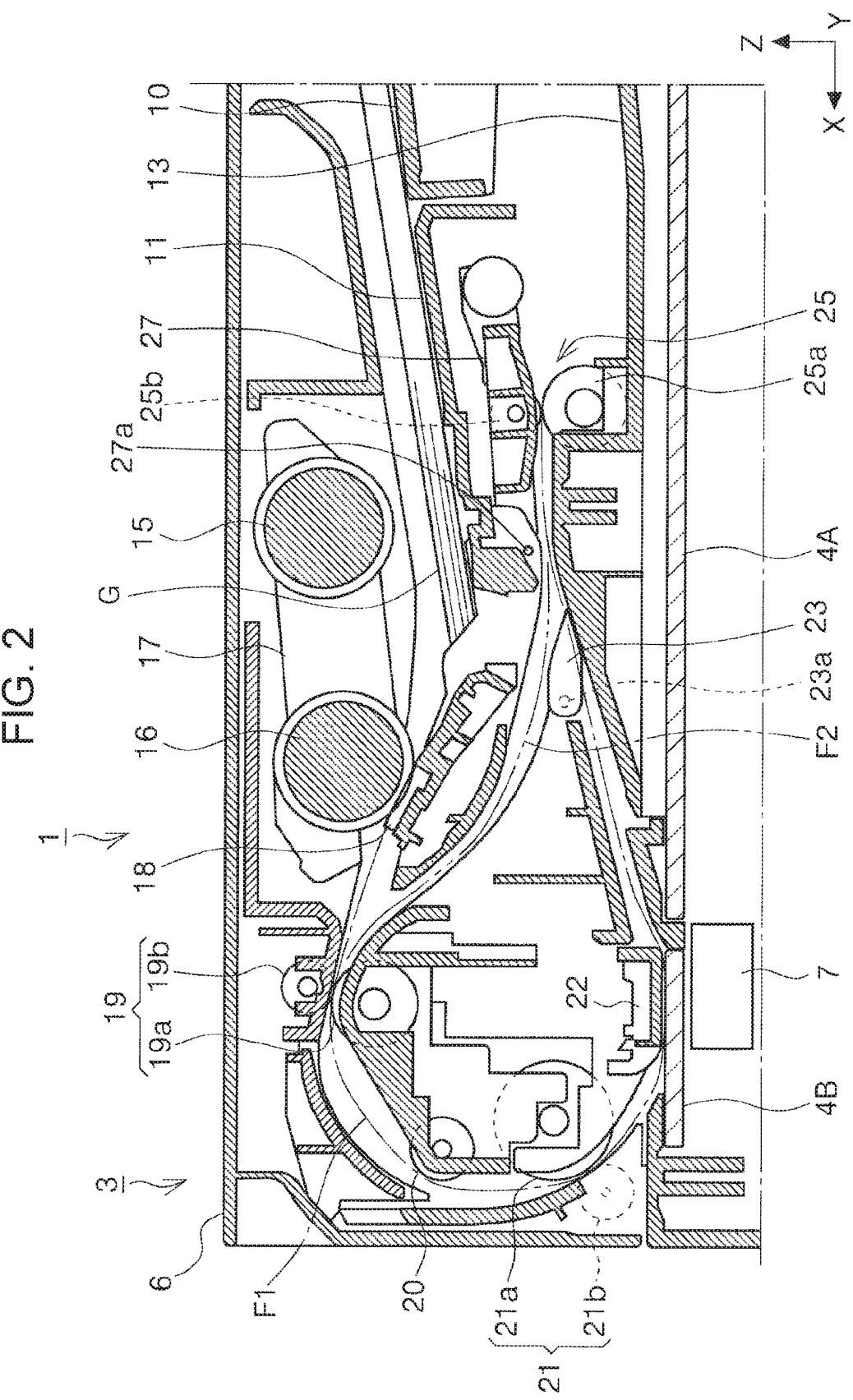
FIG. 2 is a side sectional view illustrating a document transport path in an automatic document feeder.

In FIG. 2, the document table 4A is formed as a flat and transparent glass plate, and an upper surface thereof serves as a document placing surface on which a document to be read is placed.

When a document placed on the document table 4A is read without using the ADF 3, a reading unit 7 reads a document surface while moving the lower side of the document table 4A in the X-axis direction.

A transparent glass 4B is provided in the −X direction with respect to the document table 4A, and when reading the document using the ADF 3, the reading unit 7 is stopped under the transparent glass 4B, and reads the document surface while transporting the document in that state.

The ADF 3 includes a feed tray 10 and a support tray 11 for supporting a document before feeding, and a discharge tray 13 for receiving a document, which is read and discharged outside the ADF 3. Generally, the ADF 3 has a configuration in which a document placed on the feed tray 10 and the support tray 11 is bent and reversed inside the ADF 3 to be sent on the transparent glass 4B, and the read document is discharged toward the discharge tray 13 by a discharge roller pair 25. In FIG. 2, documents placed on the feed tray 10 and the support tray 11 are indicated by a reference sign G. In the following description, a document is denoted by the reference sign G.

In FIG. 2, a transport path for transporting the document G is represented by a dashed-dotted line and a dashed-two dotted line. The dashed-dotted line indicated by a reference sign F1 is a first document transport path, and the dashed-two dotted line indicated by a reference sign F2 is a second document transport path. The respective document transport paths will be described in detail later.

In FIG. 1, edge guides 14a and 14b for guiding widthwise end portions of the document G placed thereon are provided at the feed tray 10.

A cover 6 is provided at an upper portion in the +Y direction in the ADF 3. The cover 6 is provided so as to be pivotable about a pivot shaft (not illustrated), and can take, by pivoting, a closed state as illustrated in FIG. 1 and FIG. 2, and a state (not illustrated) for opening the document transport path F1. When the cover 6 is opened, the document G can be removed when a jam occurs inside the ADF 3.

Next, a configuration on the document transport path will be described with reference to FIG. 2. A feed roller 15, which is rotationally driven by an ADF motor 52 (FIG. 3), is provided above the support tray 11. The feed roller 15 comes into contact with the uppermost document G of a plurality of documents G placed on the feed tray 10 and the support tray 11, and feeds the uppermost document G downstream.

The feed roller 15 is supported by a support member 17, and the support member 17 swings about the center of rotation of a separation roller 16 and thereby to move the feed roller 15 forward and backward with respect to the document G.

Figure 3:
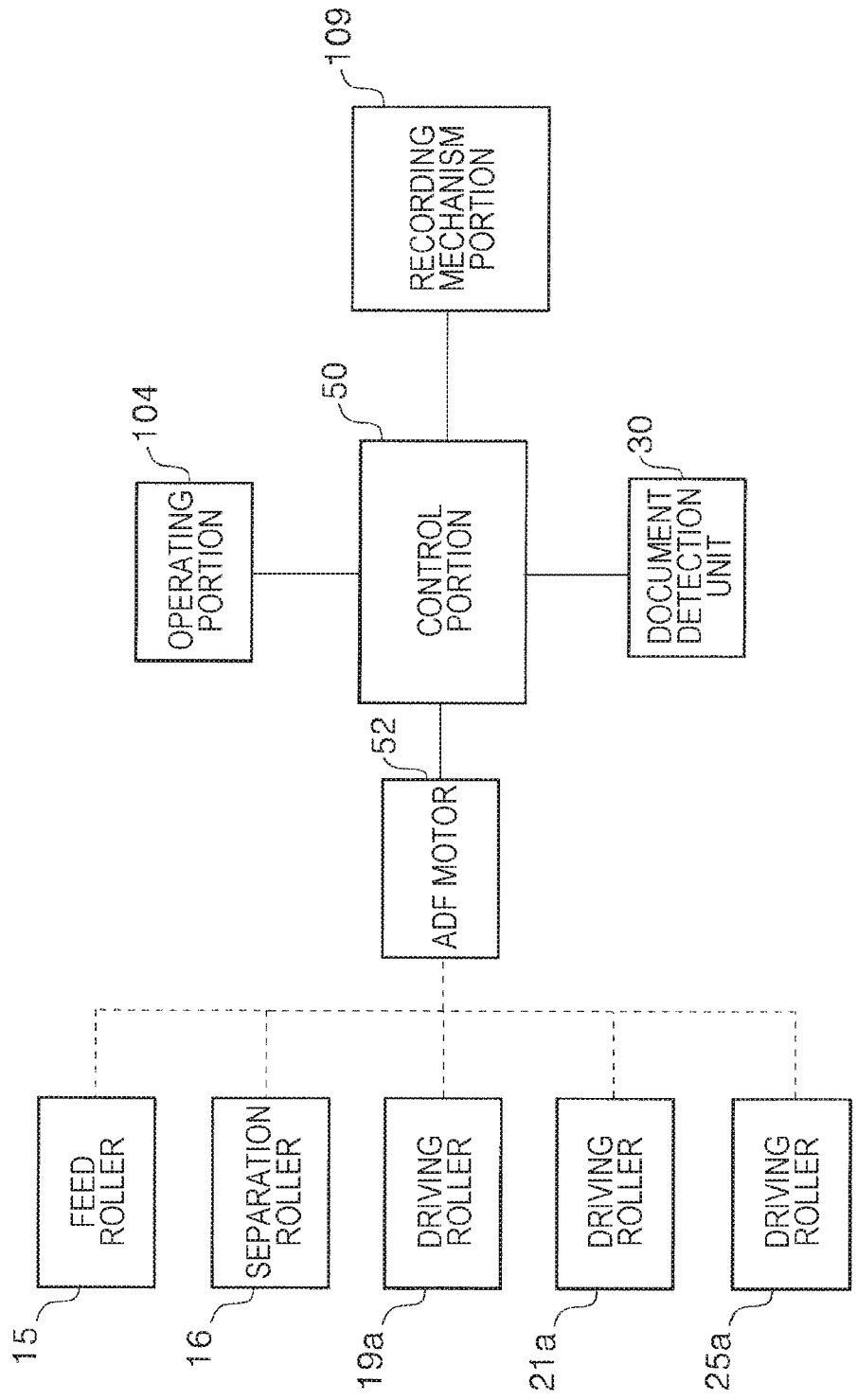
FIG. 3 is a block diagram illustrating a control system of the printer.

The separation roller 16 and a separation member 18 are provided downstream of the feed roller 15, and the document G fed out by the feed roller 15 is nipped between the separation roller 16 and the separation member 18, whereby the fed document is separated from multi-fed documents. The separation roller 16 is rotationally driven by the ADF motor 52 (FIG. 3).

An upstream transport roller pair 19 is provided downstream of the separation roller 16. The upstream transport roller pair 19 is configured by a driving roller 19a rotationally driven by the ADF motor 52 (FIG. 3) and a driven roller 19b driven to rotate while nipping the document G with the driving roller 19a.

A driven roller 20, which comes into contact with the document G and is driven to rotate, is provided downstream of the upstream transport roller pair 19.

A downstream transport roller pair 21 is provided downstream of the driven roller 20. The downstream transport roller pair 21 is configured by a driving roller 21a rotationally driven by the ADF motor 52 (FIG. 3) and a driven roller 21b driven to rotate while nipping the document G with the driving roller 21a.

The document G is transported to a reading position, i.e., to a position facing the reading unit 7 by the downstream transport roller pair 21.

Note that a document detection unit for detecting passage of a front end and a rear end of the document G is provided around the downstream transport roller pair 21 in the first document transport path F1, which will be described later.

A pressing member 22 is provided at a position facing the transparent glass 4B, and lifting of the document G from the transparent glass 4B is prevented by the pressing member 22.

In the present embodiment, the reading unit 7 is so configured to be extended in a Y-axis direction which is a main scanning direction and be movable in the X-axis direction which is a sub scanning direction by a moving mechanism (not illustrated).

The reading unit 7 is provided with a reading sensor (not illustrated). As a reading sensor, for example, a CCD (Charge Coupled Device) type or a CIS (Contact Image Sensor) type optical sensor can be used.

A flap 23 is provided downstream of the pressing member 22. The flap 23 is swingable in a clockwise direction and a counterclockwise direction in FIG. 2 about a swing shaft 23a, and blocks the first document transport path F1 by its own weight, and take a state for opening the second document transport path F2 as illustrated in FIG. 2.

The flap 23 is pushed up by the front end of the document G traveling from the reading position toward the discharge roller pair 25.

The discharge roller pair 25 is provided downstream of the flap 23 in the first document transport path F1. The discharge roller pair 25 is configured by a driving roller 25a rotationally driven by the ADF motor 52 (FIG. 3), and a driven roller 25b driven to rotate while nipping the document G with the driving roller 25a.

The driven roller 25b is supported by a support member 27. The support member 27 is provided so as to be swingable in the clockwise direction and counterclockwise direction in FIG. 2 around a swing shaft 27a, and can take a state in which the driven roller 25b is brought into contact with the driving roller 25a, by a drive unit (not illustrated) as illustrated in FIG. 2, and a state in which the driven roller 25b is separated from the driving roller 25a (not illustrated).

When reading only a first surface of the document G, the document G whose first surface has been read is discharged to the discharge tray 13 by the discharge roller pair 25.

When reading both surfaces of the first surface of the document G and a second surface opposite thereto, the document G whose first surface has been read is discharged by the discharge roller pair 25 to the discharge tray 13 only by a predetermined range while maintaining a state in which the rear end is nipped by the discharge roller pair 25. Thereafter, the document G is switch-back transported by the discharge roller pair 25 being reversely driven, and an end portion which has been the rear end becomes the front end and enters the second document transport path F2.

When the front end of the document G fed into the second document transport path F2 is nipped by the upstream transport roller pair 19, a posture of the support member 27 is switched, and the driven roller 25b is separated from the driving roller 25a.

Thereafter, the document G is transported in the same manner as in the first surface reading, and the second surface is read.

Note that in the present embodiment, the first document transport path F1 is defined as a path from a document nip position by the separation roller 16 and the separation member 18 to a document nip position by the discharge roller pair 25 via the upstream transport roller pair 19, the downstream transport roller pair 21, the pressing member 22, and the flap 23.

Further the second document transport path F2 is defined as a path from the flap 23 to the upstream transport roller pair 19.

The first document transport path F1 is a document transport path including the downstream transport roller pair 21, and the second document transport path F2 is a document transport path for feeding the document fed downstream in the document transport direction from the downstream transport roller pair 21 to an upstream position of the downstream transport roller pair 21 in the first document transport path F1, more specifically, to the upstream transport roller pair 19.

Next, a control system of the printer 100 will be described with reference to FIG. 3. Note that in FIG. 3, a solid line coupling constituent elements means an electrical coupling, and a broken line means a mechanical coupling.

A control portion 50 of the printer 100 controls the recording unit 101 (see FIG. 1) and the scanner unit 1 (see FIG. 1) based on a signal received from the operating portion 104. In FIG. 3, a recording mechanism portion 109 includes a motor (not illustrated) as a power source for transporting a recording sheet in the recording unit 101, a motor (not illustrated) for driving the carriage 107 (see FIG. 1), the recording head 108 (see FIG. 1), and the like, and realizes a recording function for performing recording on the recording sheet.

In the scanner unit 1, the control portion 50 controls the ADF motor 52 based on a signal received from the operating portion 104 and detection information of a document detection unit 30 which will be described later. Note that in FIG. 2, although the illustration of the document detection unit 30 is omitted in order to avoid complication of the drawing, the document detection unit 30 is provided in the vicinity of the downstream transport roller pair 21.

The ADF motor 52 serves as a power source for the feed roller 15, the separation roller 16, the driving roller 19a, the driving roller 21a, and the driving roller 25a, which have been described with reference to FIG. 2. Power is transmitted from the ADF motor 52 to each roller by a power transmission mechanism (not illustrated) provided for each roller.

The above described power transmission mechanism realizes the following functions. When the ADF motor 52 normally rotates, the feed roller 15 and the separation roller 16 rotate in the clockwise direction in FIG. 2, i.e., in a direction in which the document G is fed downstream, and when the ADF motor 52 reversely rotates, power is not transmitted to the feed roller 15 and the separation roller 16, so that the feed roller 15 and the separation roller 16 are stopped. Note that when the ADF motor 52 normally rotates, the support member 17 (see FIG. 2) supporting the feed roller 15 brings the feed roller 15 into contact with the document G, and when the ADF motor 52 reversely rotates, the support member 17 separates the feed roller 15 from the document G. Further, a one-way clutch (not illustrated) is provided in a power transmission path between the separation roller 16 and the ADF motor 52, and in a state in which power transmission from the ADF motor 52 to the separation roller 16 is cut off, the separation roller 16 can rotate following the document G to be transported.

In addition, regardless of normal rotation and reverse rotation of the ADF motor 52, the driving roller 19a rotates in the counterclockwise direction in FIG. 2, i.e., in a direction in which the document G is fed downstream. Such a function can be realized by, for example, a planetary gear mechanism or a one-way clutch.

In addition, when the ADF motor 52 normally rotates, the driving roller 21a rotates in the counterclockwise direction in FIG. 2, i.e., in a direction in which the document G is fed downstream, and when the ADF motor 52 reversely rotates, the driving roller 21a rotates in the clockwise direction in FIG. 2, i.e., in a direction in which the document G is returned upstream.

Thus, it becomes possible to perform skew correction of so-called biting discharge method in which the front end of the document is fed downstream of the downstream transport roller pair 21 by a predetermined amount to be then discharged upstream, and skew correction of so-called bumping method in which the front end of the document is bumped between the driving roller 21a which rotates in a direction in which the document G is returned upstream and the driven roller 21b.

In addition, when the ADF motor 52 normally rotates, the driving roller 25a rotates in the clockwise direction in FIG. 2, i.e., in the direction in which the document G is fed downstream, and when the ADF motor 52 reversely rotates, the driving roller 25a rotates in the counterclockwise direction in FIG. 2, i.e., in the direction in which the document G is returned upstream.

Thus, the document G can be discharged to the discharge tray 13, and the document G can be fed into the second document transport path F2.

Subsequently, the document detection unit 30 will be described with reference to FIG. 4 and the following figures. Note that in FIG. 4 to FIG. 12, only the necessary constituent elements on the document transport path are illustrated in order to avoid the complication of the drawing.

Figure 4:
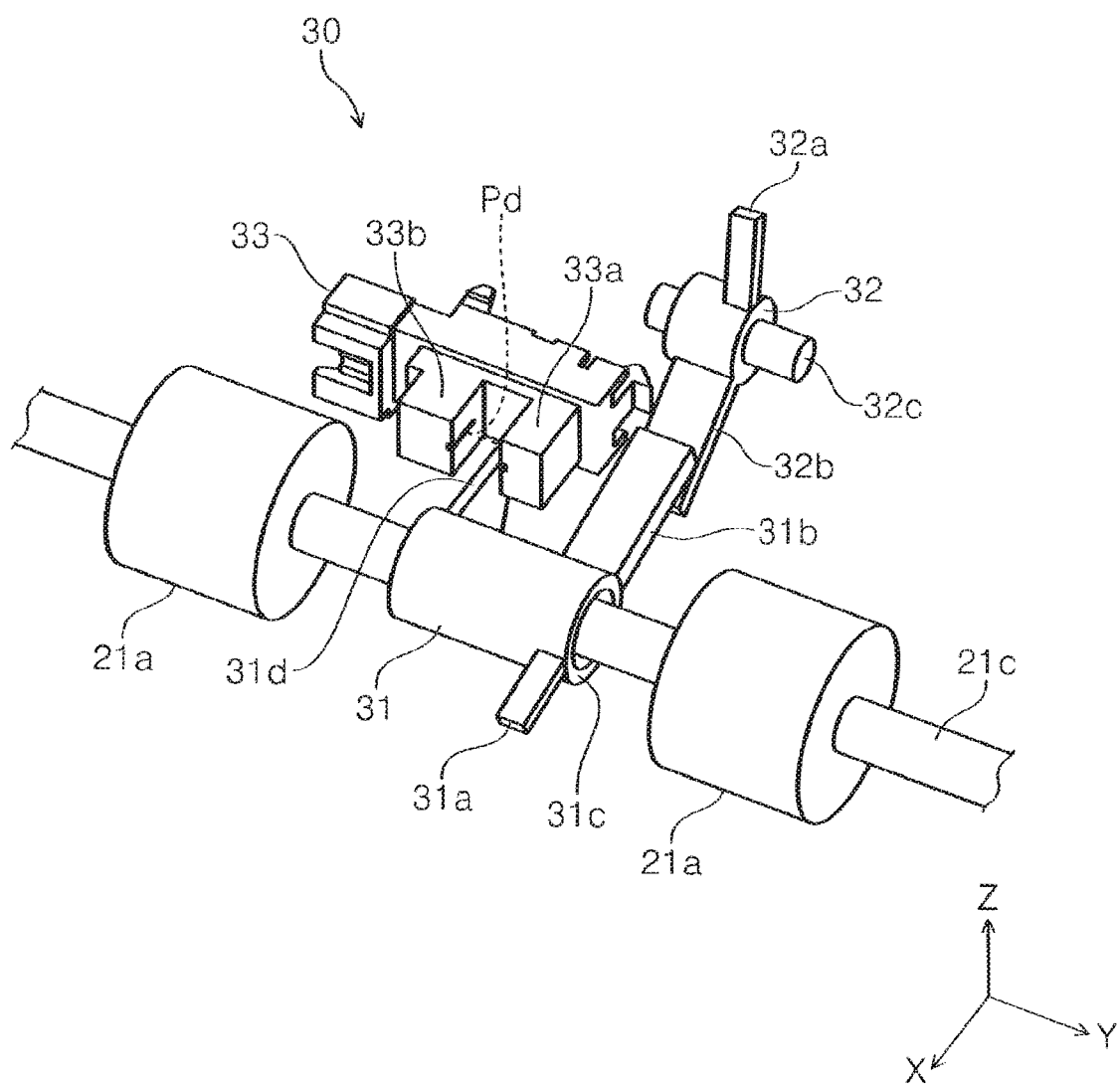
FIG. 4 is a perspective view of a document detection unit.
Figure 5:
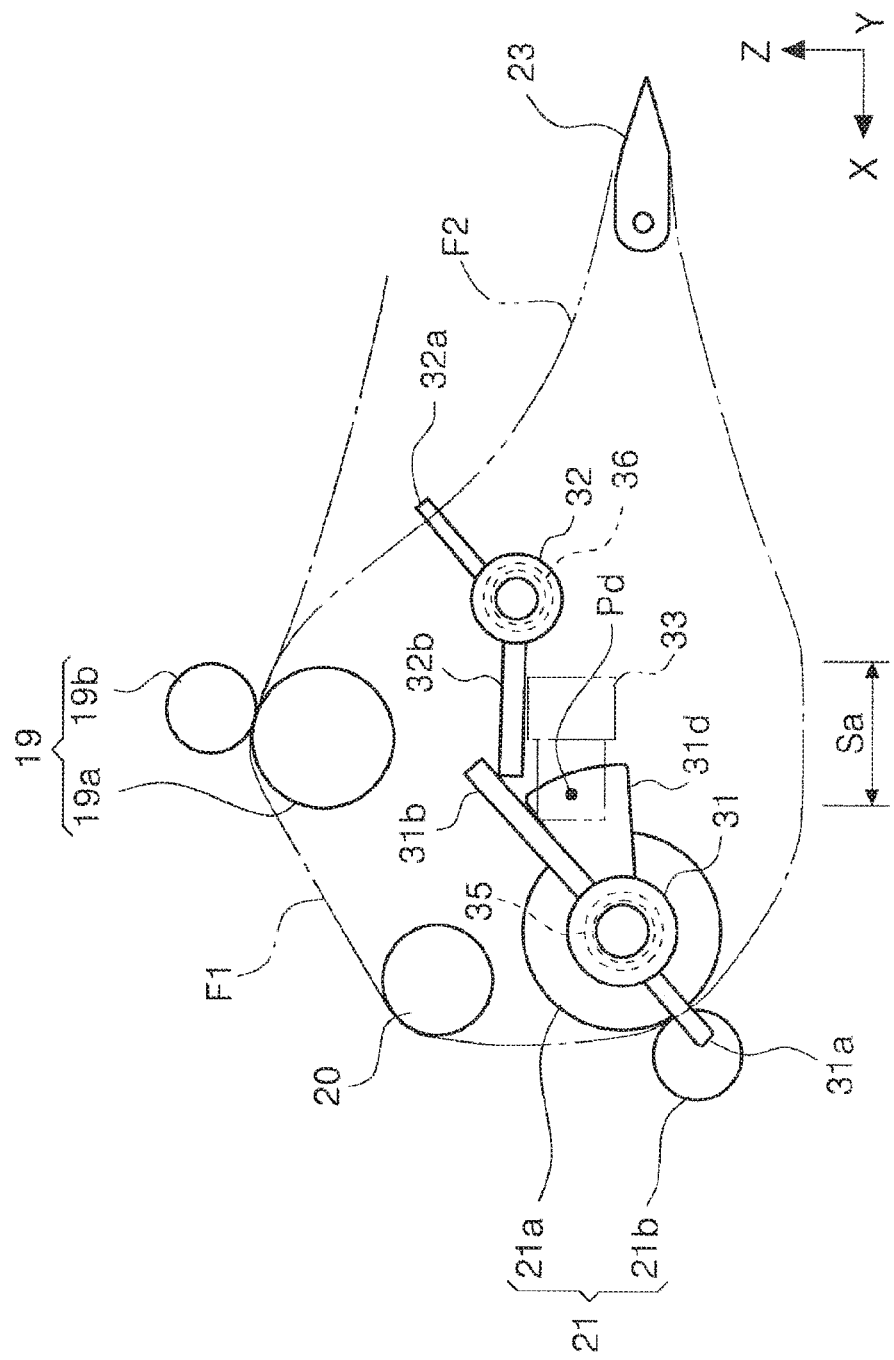
FIG. 5 is a diagram illustrating a state of the document detection unit.

As illustrated in FIG. 4 and FIG. 5, the document detection unit 30 includes a first rotating portion 31 having a first contact portion 31a with which the front end of the document G can come into contact in the first document transport path F1, and being rotatable in a first rotation direction (clockwise direction in FIG. 5 to FIG. 12) and in a second rotation direction opposite thereto (counterclockwise direction in FIG. 5 to FIG. 12). Further, the document detection unit 30 includes a second rotating portion 32 having a second contact portion 32a with which the front end of the document G can come into contact in the second document transport path F2, regulating a posture of the first rotating portion 31 by being engaged in the first rotating portion 31, and being rotatable in a third rotation direction (clockwise direction in FIG. 5 to FIG. 12) and a fourth rotation direction opposite thereto (counterclockwise direction in FIG. 5 to FIG. 12).

In addition, the document detection unit 30 includes a detection portion 33 capable of detecting a detection target portion 31d provided at the first rotating portion 31.

In the present embodiment, since the first rotation direction and the third rotation direction described above are the same in the present embodiment, hereinafter, the first rotation direction and the third rotation direction are not distinguished from each other and are referred to as "clockwise direction" with reference to the rotation direction in FIG. 5 to FIG. 12. Similarly, since the second rotation direction and the fourth rotation direction described above are the same direction, hereinafter, the second rotation direction and the fourth rotation direction are not distinguished from each other and are referred to as "counterclockwise direction" with reference to the rotation direction in FIG. 5 to FIG. 12.

Note that in the present embodiment, although a rotation axis line of the first rotating portion 31 and a rotation axis line of the second rotating portion 32 are parallel to each other, it is not necessary to be parallel to each other.

The detection portion 33 is configured by an optical sensor, and includes a light emitting portion 33a for emitting detection light and a light receiving portion 33b for receiving the detection light. A reference sign Pd is an optical axis of the detection light emitted from the light emitting portion 33a, and the detection target portion 31d provided at the first rotating portion 31 switches between a state in which the detection target portion 31d blocks the optical axis Pd along with the rotation of the first rotating portion 31 and a state in which the detection target portion 31d is away from the optical axis Pd.

More specifically, the detection target portion 31d switches between a first open state (see FIG. 7 and FIG. 12) in which the detection target portion 31d deviates from the optical axis Pd to an upward direction that is a first direction, and a second open state (see FIG. 10) in which the detection target portion 31d deviates from the optical axis Pd to a downward direction that is a second direction.

In the present embodiment, as illustrated in FIG. 4, the first rotating portion 31 has a cylindrical portion 31c, in a manner such that a rotating shaft 21c of the driving roller 21a is passed through the cylindrical portion 31c. That is, the first rotating portion 31 has the rotating shaft 21c of the driving roller 21a as a rotation shaft, in other words, the first rotating portion 31 shares the rotation shaft with the driving roller 21a.

The detection target portion 31d is formed at an end portion in the −Y direction with respect to the cylindrical portion 31c, and the first contact portion 31a and a first engagement portion 31b which will be described later are formed at an end portion in the +Y direction with respect to the cylindrical portion 31c.

Although not illustrated in FIG. 4, a first spring 35 is provided at the first rotating portion 31 as illustrated in FIG. 5, and an external force in the clockwise direction in FIG. 5 to FIG. 12 is applied to the first rotating portion 31 by the first spring 35. Further, a second spring 36 is provided at the second rotating portion 32, and an external force in the clockwise direction in FIG. 5 to FIG. 12 is applied to the second rotating portion 32 by the second spring 36.

In the present embodiment, the first spring 35 and the second spring 36 are both coil springs.

Figure 10:
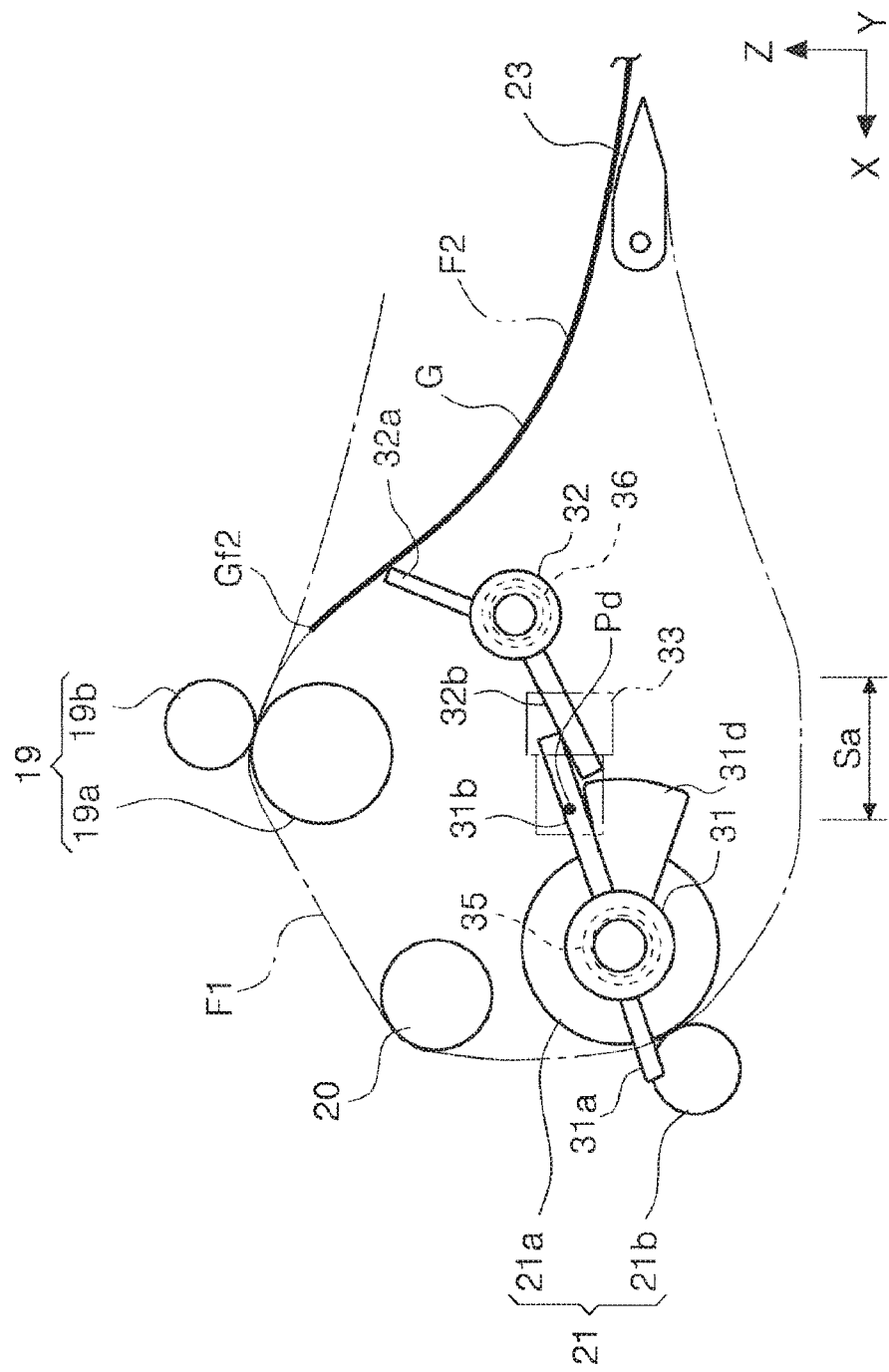
FIG. 10 is a diagram illustrating a state of the document detection unit.

The first rotating portion 31 can take a first detection posture in which the first contact portion 31a protrudes to the first document transport path F1 at a first position of the first document transport path F1. The first detection posture of the first rotating portion 31 is illustrated in FIG. 10. In FIG. 10, the first contact portion 31a is located at the first position. The first position of the first contact portion 31a in the present embodiment is located upstream of the document nip position in the downstream transport roller pair 21. A position at which the driving roller 21a and the driven roller 21b contact each other in the downstream transport roller pair 21 is the document nip position.

Further the first rotating portion 31 rotates in the counterclockwise direction from the first detection posture illustrated in FIG. 10, and can take a second detection posture in which the first contact portion 31a protrudes to the first document transport path F1 at a second position downstream of the first position in the document transport direction illustrated in FIG. 10. The second detection posture of the first rotating portion 31 is illustrated in FIG. 5, FIG. 6, FIG. 8, FIG. 9, and FIG. 11. In FIG. 5, FIG. 6, FIG. 8, FIG. 9, and FIG. 11, the first contact portion 31a is located at the second position. The second position of the first contact portion 31a in the present embodiment is located downstream of the document nip position in the downstream transport roller pair 21. Further, a reading region Sa by the reading unit 7 is positioned downstream of the first contact portion 31a at the second position in the present embodiment.

Figure 6:
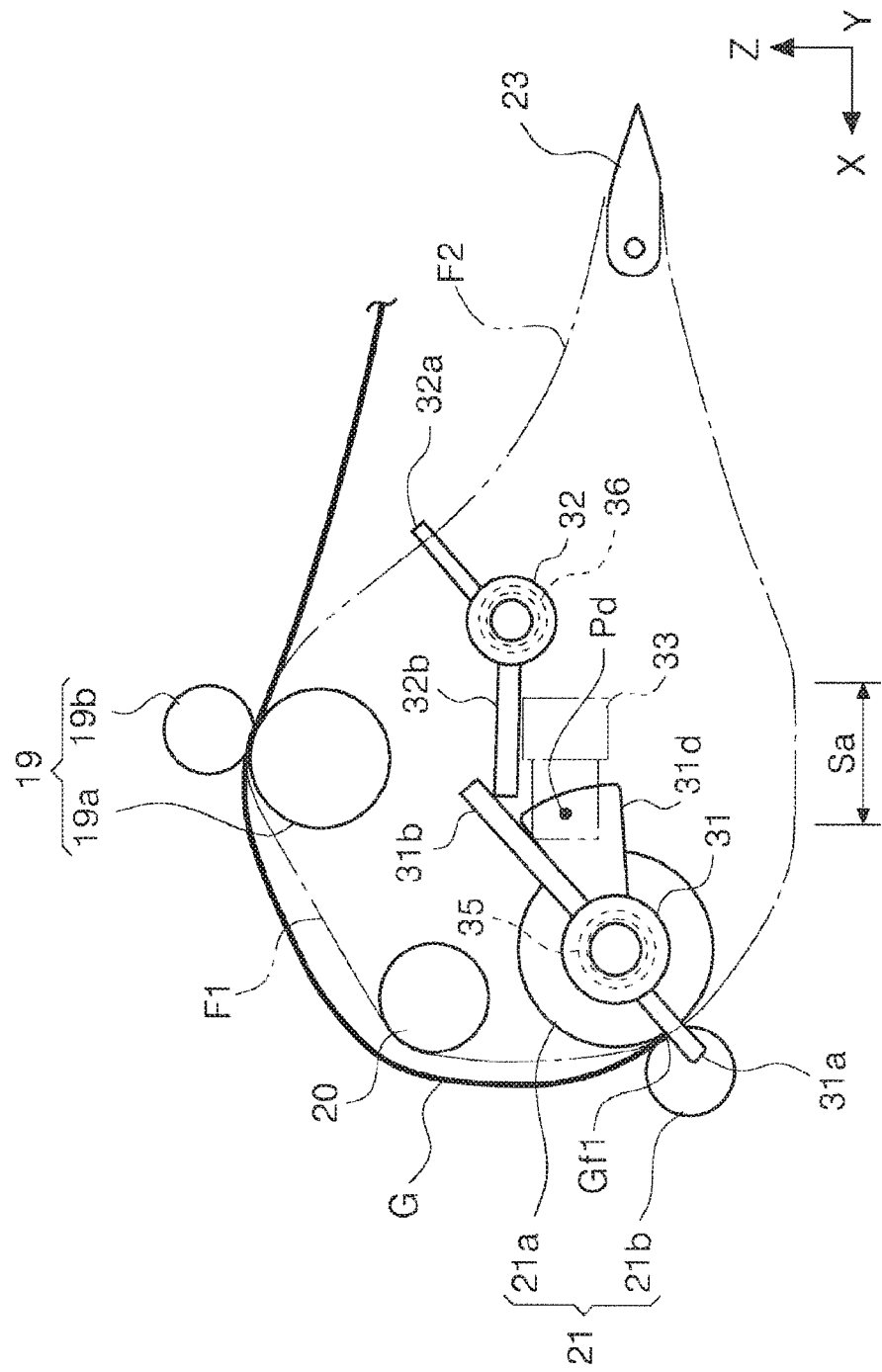
FIG. 6 is a diagram illustrating a state of the document detection unit.
Figure 7:
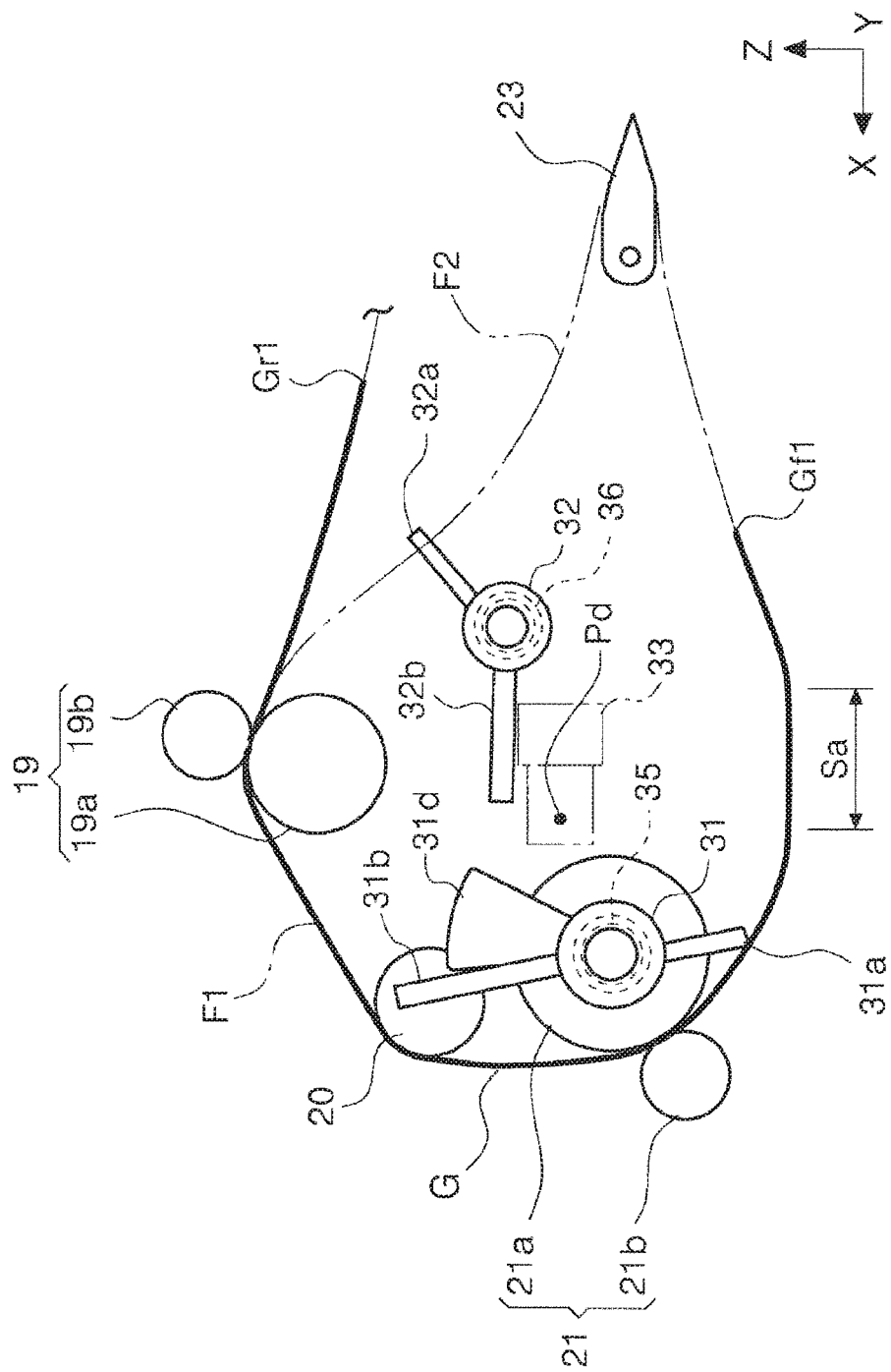
FIG. 7 is a diagram illustrating a state of the document detection unit.
Figure 11:
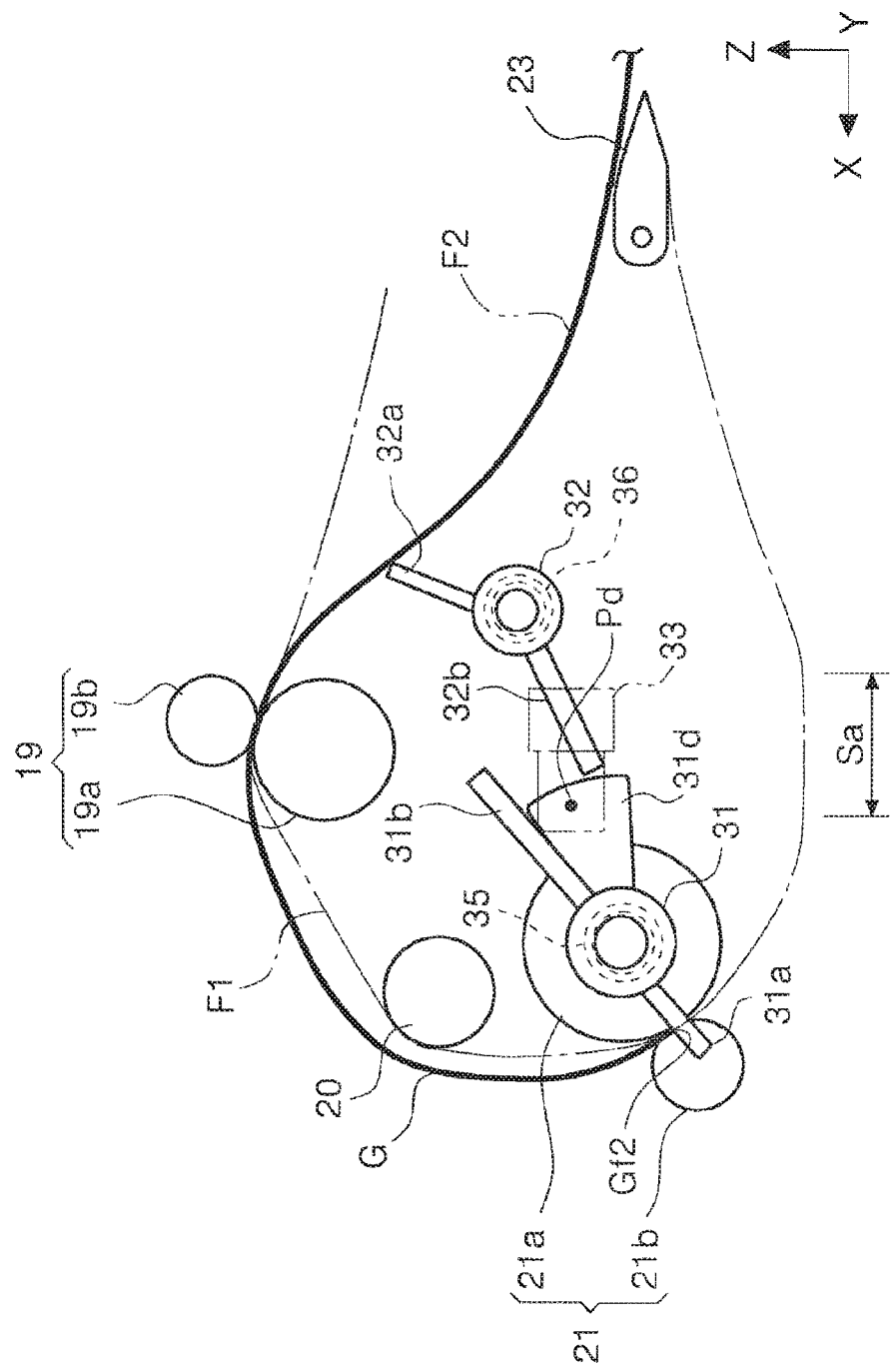
FIG. 11 is a diagram illustrating a state of the document detection unit.
Figure 12:
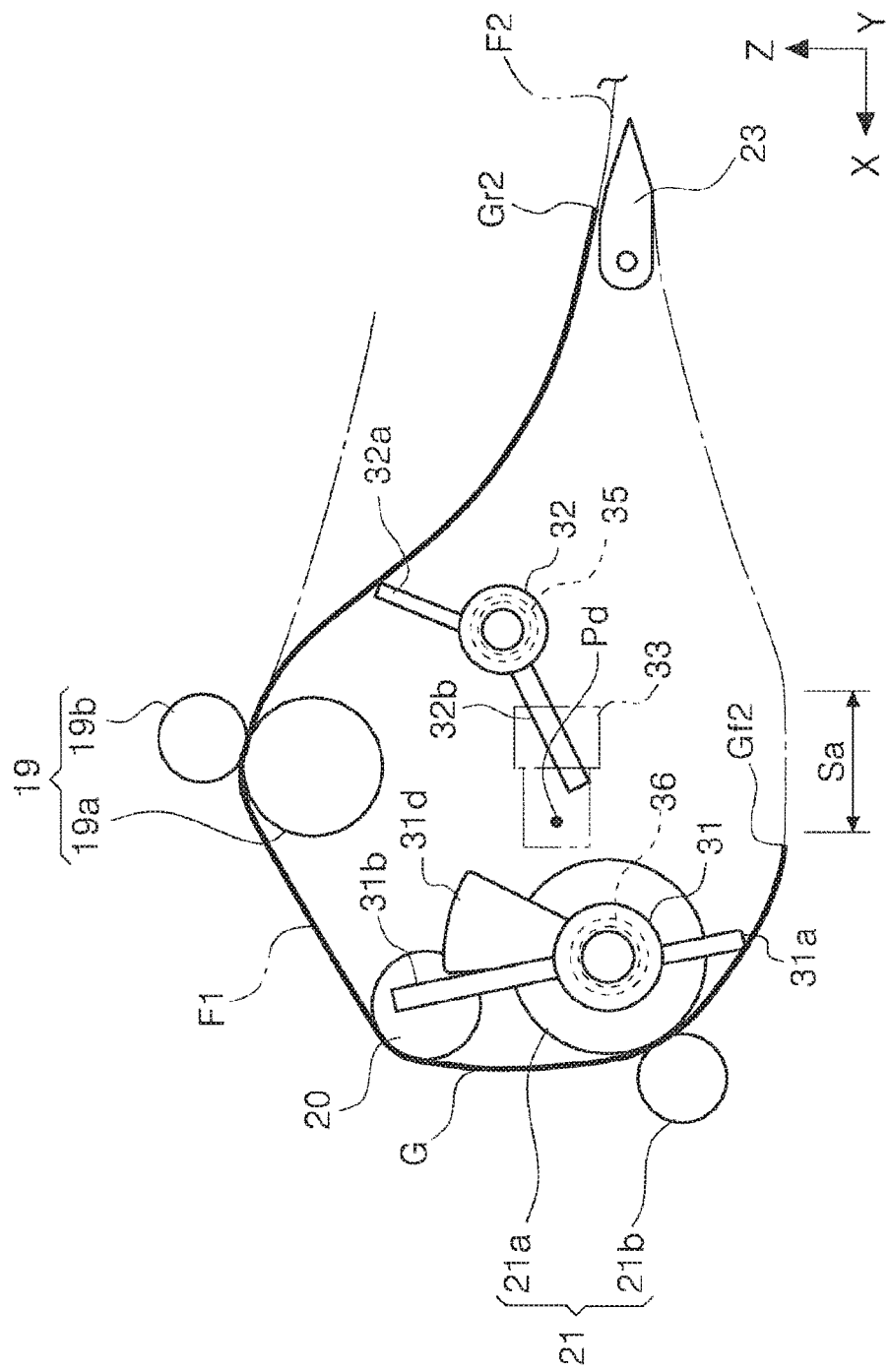
FIG. 12 is a diagram illustrating a state of the document detection unit.

In addition, the first rotating portion 31 rotates in the counterclockwise direction from the second detection posture illustrated in FIG. 5, FIG. 6, FIG. 8, FIG. 9, and FIG. 11, and can take a third detection posture in which the first contact portion 31a retracts more from the first document transport path F1 in comparison with the second detection posture. The third detection posture of the first rotating portion 31 is illustrated in FIG. 7 and FIG. 12.

The first rotating portion 31 is rotatable from the first detection posture to the third detection posture, and is applied with a force to rotate in the clockwise direction in FIG. 5 to FIG. 12 by the first spring 36.

Figure 8:
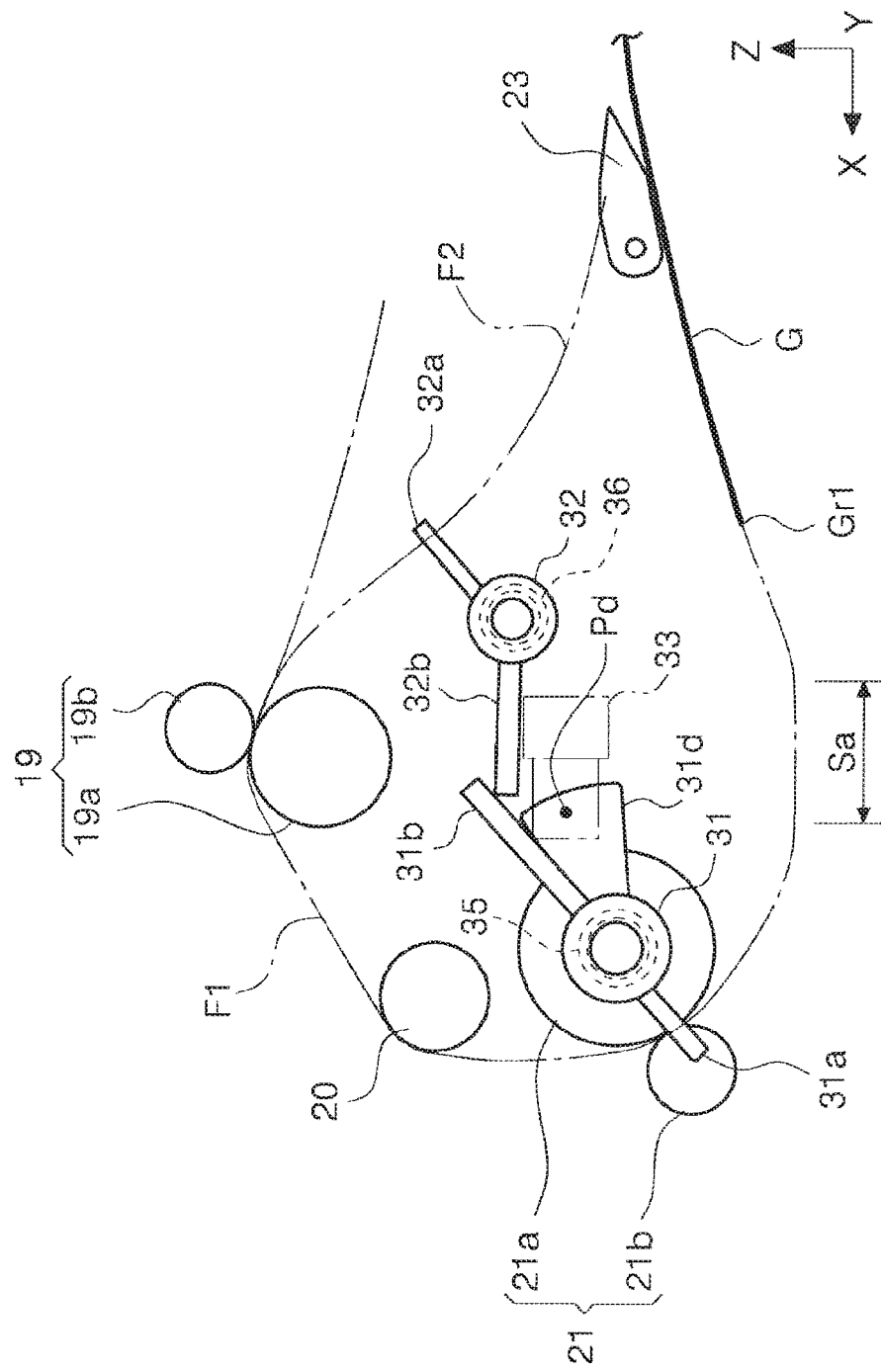
FIG. 8 is a diagram illustrating a state of the document detection unit.
Figure 9:
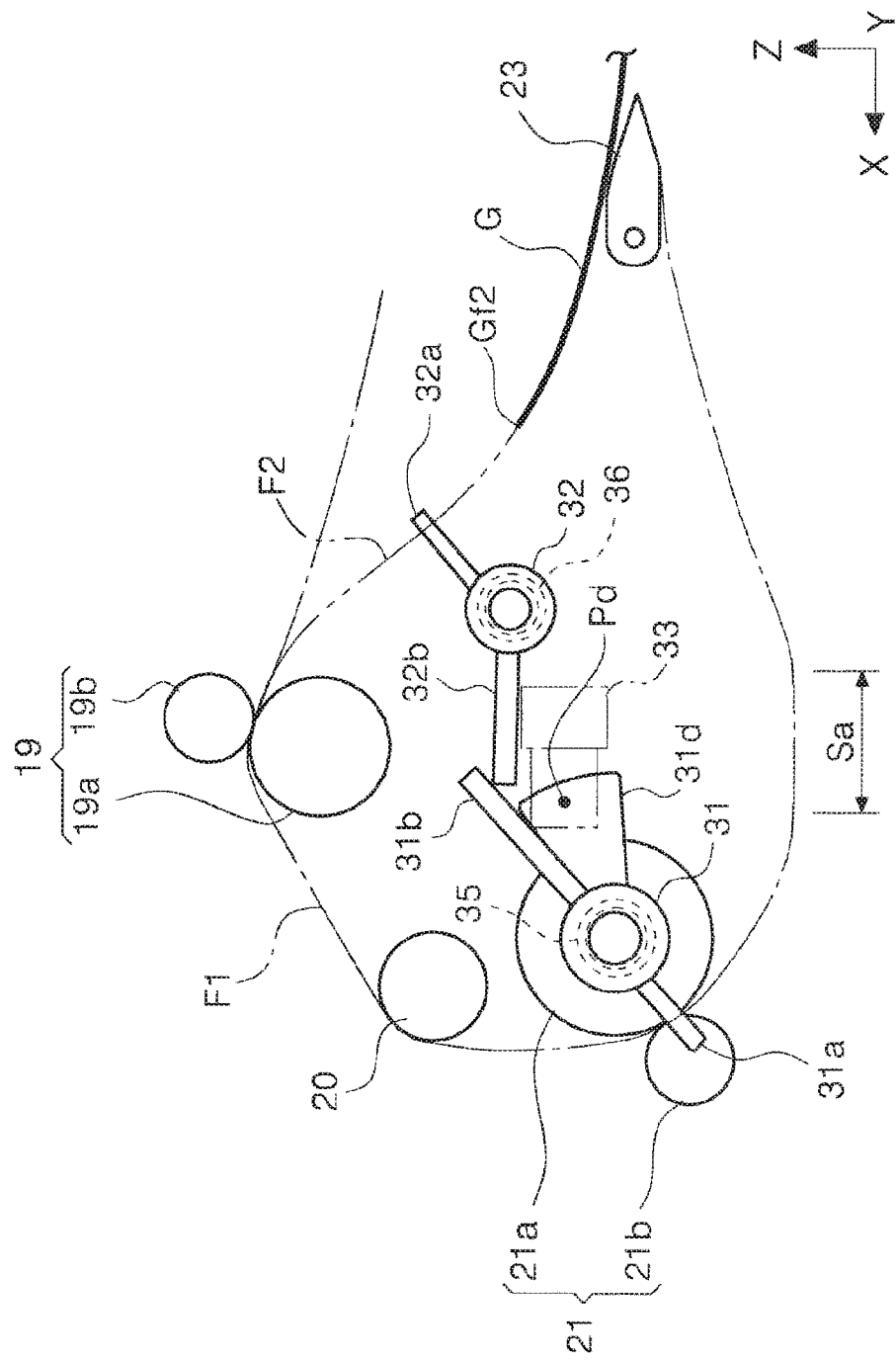
FIG. 9 is a diagram illustrating a state of the document detection unit.

As illustrated in FIG. 5, FIG. 8, and FIG. 9, the second rotating portion 32 can take a first state in which the second contact portion 32a protrudes to the second document transport path F2, and which maintains the first rotating portion 31 in the second detection posture in a state in which the document G is not in contact with the first contact portion 31a, and also which allows rotation of the first rotating portion 31 in the counterclockwise direction. When the second rotating portion 32 is in the first state, the first rotating portion 31 can rotate in the counterclockwise direction as illustrated in the change from FIG. 6 to FIG. 7.

In addition, as illustrated in FIG. 10, the second rotating portion 32 can take a second state in which the second contact portion 32a retracts from the second document transport path F2, and which allows the first rotating portion 31 to take the first detection posture in a state in which the document is not in contact with the first contact portion 31a, and also which allows rotation of the first rotating portion 31 in the counterclockwise direction. When the second rotating portion 32 is in the second state, the first rotating portion 31 can rotate in the counterclockwise direction in the first detection posture illustrated in FIG. 10 as illustrated in the change from FIG. 10 to FIG. 11.

The second rotating portion is rotatable between the first state and the second state, and is applied with a force to rotate in the clockwise direction in FIG. 5 to FIG. 12 by the second spring 36.

The first rotating portion 31 has the first engagement portion 31b, the second rotating portion 32 has a second engagement portion 32b, and in the first rotating portion 31 and the second rotating portion, the first engagement portion 31b and the second engagement portion 32b are engaged with each other. The second rotating portion 32 supports the first engagement portion 31b by the second engagement portion 32b, thereby maintaining the first rotating portion 31 in the second detection posture in the first state as illustrated in FIG. 5, FIG. 6, FIG. 8, and FIG. 9.

The second spring 36 for pressing the second rotating portion 32 in the clockwise direction in FIG. 5 to FIG. 12 is set to a spring force that can maintain the first rotating portion 31 in the second detection posture in the first state of the second rotating portion 32 as illustrated in FIG. 5, FIG. 6, FIG. 8, and FIG. 9. That is, a force that the second spring 36 presses the second rotating portion 32 is set to be stronger than a force that the first spring 35 presses the first rotating portion 31.

Hereinafter, referring to FIG. 13 and FIG. 14 as well as FIG. 5 to FIG. 12, control for reading both the first surface of the document G and the second surface opposite thereto will be described below. In FIG. 6 to FIG. 12, an end portion which becomes the front end of the document G at the time of reading the first surface is denoted by a reference sign Gf1, and an end portion to be the rear end is denoted by a reference sign Gr1. In addition, an end portion which becomes the front end at the time of reading the second surface is denoted by a reference sign Gf2, and an end portion to be the rear end is denoted by a reference sign Gr2. The document rear end Gr1 at the time of reading of the first surface and the document front end Gf2 at the time of reading of the second surface are the same end portion. In addition, the document front end Gf1 at the time of reading the first surface and the document rear end Gr2 at the time of reading the second surface are the same end portion.

Note that, in the following description, for the rotation direction of each roller, rotation in a case where the document G is sent downstream is referred to as normal rotation, and rotation opposite thereto is referred to as reverse rotation. For the driving roller 25a (see FIG. 2) configuring the discharge roller pair 25 (see FIG. 2), rotation in a case where the document G is discharged to the discharge tray 13 is set as normal rotation, and rotation when the document G is fed into the second document transport path F2 is set as reverse rotation.

In order to feed the document G, the control portion 50 causes the ADF motor 52 to normally rotate by a predetermined amount from a feed standby state (step S101). Note that FIG. 5 illustrates the feed standby state. In the feed standby state, the second rotating portion 32 is in the first state, the first rotating portion 31 is in the second detection posture, and the detection target portion 31d is in a light shielding state. In step S101, the document front end Gf1 is nipped by the upstream transport roller pair 19.

When the front end of the document G is nipped by the upstream transport roller pair 19, the control portion 50 causes the ADF motor 52 to reversely rotate by a predetermined amount (step S102). At this time, the predetermined amount is set such that the document front end Gf1 is bumped against the reversely rotating downstream transport roller pair 21, and the document G can be deflected between the upstream transport roller pair 19 and the downstream transport roller pair 21 as illustrated in FIG. 6. Thus, the skew correction by the so-called bumping method is performed. Note that instead of the skew correction with the bumping method, the skew correction with the above-described biting discharge method may be performed.

Next, the control portion 50 causes the ADF motor 52 to normally rotate (step S103). In step S103, the document front end Gf1 is nipped by the downstream transport roller pair 21, and then comes into contact with the first contact portion 31a.

Additionally, when the document front end Gf1 further advances downstream, the first rotating portion 31 is switched from the second detection posture to the third detection posture as illustrated in the change from FIG. 6 to FIG. 7, while the second rotating portion 32 maintains the first state in the document detection unit 30. At this time, the detection target portion 31d is switched from the light shielding state to the first open state, and the document detection unit 30 is switched from an ON state to an OFF state (Yes in step S104).

Figure 13:
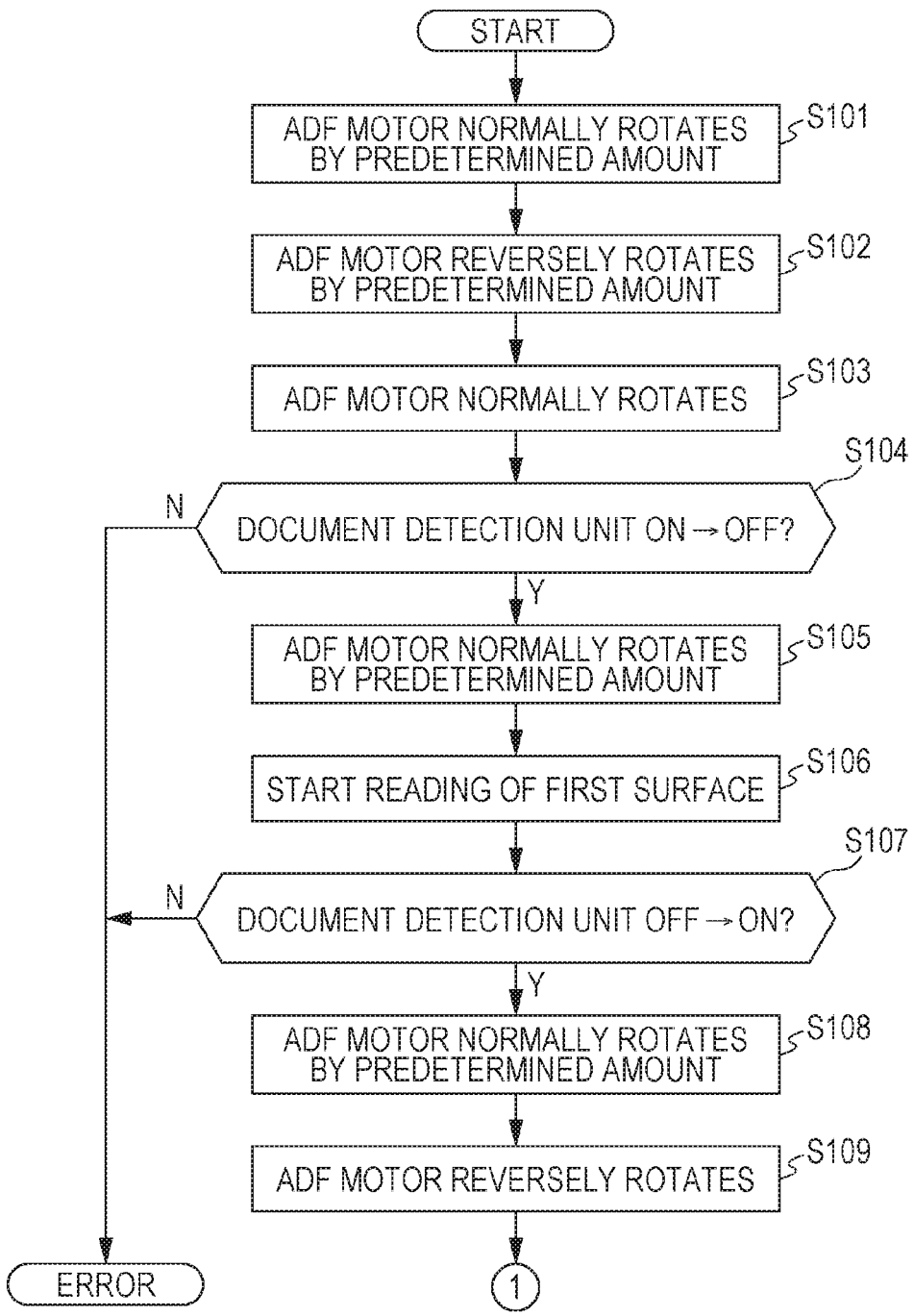
FIG. 13 is a flowchart illustrating control at the time of reading a document.
Figure 14:
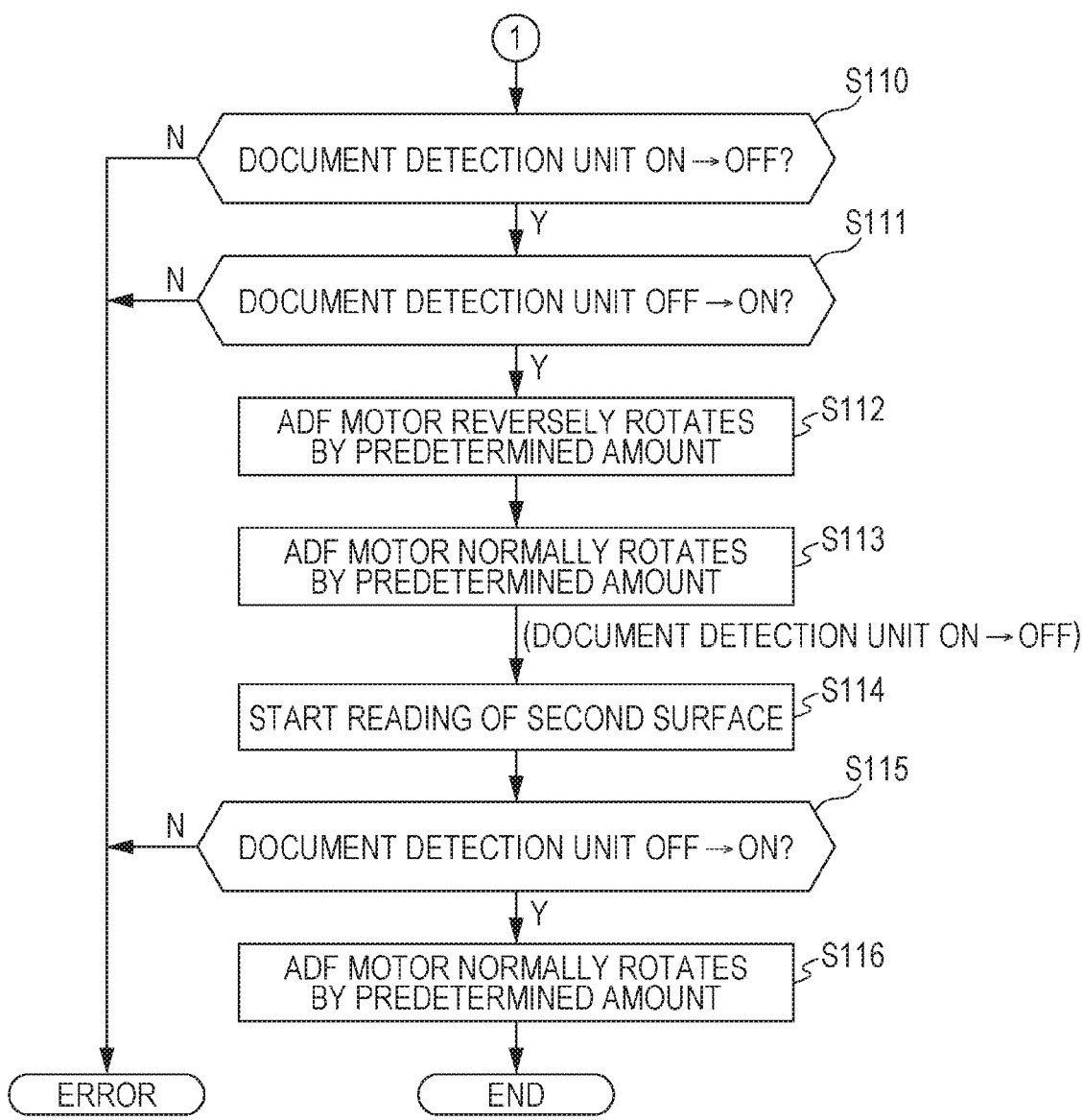
FIG. 14 is a continuation of the flow chart illustrated in FIG. 13.

Note that the ON state of the document detection unit 30 in FIG. 13 means that the detection target portion 31d is in the light shielding state. The OFF state of the document detection unit 30 means that the detection target portion 31d is in either the first open state or the second open state. The control portion 50 cannot specify whether the detection target portion 31d is in the first open state or the second open state by only that the document detection unit 30 is in the OFF state, but can specify whether the detection target portion 31d is in the first open state or the second open state based on the flow of document feed control, the change from the ON state to the OFF state, or the change from the OFF state to the ON state, as described later.

Note that the control portion 50 may specify whether control currently performed using flag information is control at the time of reading of the first surface or control at the time of reading of the second surface. Also in this manner, it is possible to specify whether the detection target portion 31d is in the first open state or the second open state based on change in the state of the document detection unit 30.

When the document detection unit 30 is switched from the ON state to the OFF state (Yes in step S104), the control portion 50 causes the ADF motor 52 to normally rotate by a predetermined amount (step S105). In step S105, the document front end Gf1 is aligned at a reading start position. At this time, the predetermined amount is an amount for positioning the document front end Gf1 at a start position of the reading region Sa.

Note that in a case where the document detection unit 30 is not switched from the ON state to the OFF state even when the ADF motor 52 is normally rotated by a predetermined amount (No in step S104), it is determined that a jam has occurred, and process shifts to error processing. Details of the error processing will be omitted herein.

Next, the control portion 50 starts reading out of the first surface (step S106). A first surface reading operation in step S106 includes a normal rotation operation of the ADF motor 52.

When the document reading on the first surface is proceeded, later, the document rear end Gr1 is separated from the first contact portion 31a. In the document detection unit 30, while the second rotating portion 32 maintains the first state, the first rotating portion 31 is switched from the third detection posture to the second detection posture as illustrated in the change from FIG. 7 to FIG. 8. At this time, the detection target portion 31d is switched from the first open state to the light shielding state, and the document detection unit 30 is switched from the OFF state to the ON state (Yes in step S107).

Note that in a case where the document detection unit 30 is not switched from the OFF state to the ON state even when the ADF motor 52 is rotated by a predetermined amount after the start of the reading of the first surface (No in step S107), it is determined that the jam has occurred, and the process shifts to error processing. Additionally, in this case, the predetermined amount may be set as an amount in which a predetermined margin is provided to a rotation amount of the ADF motor 52 required to transport the document of the assumed maximum size, for example.

When the document detection unit 30 is switched from the OFF state to the ON state (Yes in step S107), the control portion 50 causes the ADF motor 52 to normally rotate by a predetermined amount (step S108). As the result, the document rear end Gr1 is moved toward the downstream side of the flap 23.

Next, the control portion 50 causes the ADF motor 52 to reversely rotate by a predetermined amount (step S109). As the result, the document G is fed to the second document transport path F2 as illustrated in FIG. 9, by changing the denotation of the document rear end Gr1 to the document front end Gf2. At this time, the predetermined amount is an amount for allowing the document front end Gf2 to reach the first contact portion 31a (see FIG. 10) located at the first position.

Thereafter, in the document G fed to the second document transport path F2, the front end Gf2 comes into contact with the second contact portion 32a of the second rotating portion 32, and then, the second contact portion 32a is retracted from the second document transport path F2. As the result, as illustrated in the change from FIG. 9 to FIG. 10, the second rotating portion 32 is switched from the first state to the second state.

That is, since the second rotating portion 32 rotates in the counterclockwise direction and the second engagement portion 32b retracts in the downward direction, the first rotating portion 31 rotates in the clockwise direction to be switched from the second detection posture to the first detection posture. At this time, the detection target portion 31d is switched from the light shielding state to the second open state, and the document detection unit 30 is switched from the ON state to the OFF state (Yes in step S110).

Note that in a case where the document detection unit 30 is not switched from the ON state to the OFF state even when the ADF motor 52 is reversely rotated by a predetermined amount (No in step S110), it is determined that the jam has occurred, and the process shifts to error processing.

Next, when the document front end Gf2 proceeds further downstream, the document front end Gf2 comes into contact with the first contact portion 31a of the first rotating portion 31 in the first detection posture (see FIG. 10), and the document front end Gf2 rotates the first rotating portion 31 in the counterclockwise direction. At this time, the detection target portion 31d is switched from the second open state to the light shielding state as illustrated in the change from FIG. 10 to FIG. 11, and the document detection unit 30 is switched from the OFF state to the ON state (Yes in step S111).

The control portion 50 further causes the ADF motor 52 to reversely rotate by a predetermined amount (step S112) from this timing. At this time, the predetermined amount is set such that the document front end Gf2 is bumped against the reversely rotating downstream transport roller pair 21, and the document G can be deflected between the upstream transport roller pair 19 and the downstream transport roller pair 21 as illustrated in FIG. 11. Thus, the skew correction with the so-called bumping method is performed. Note that instead of the skew correction with the bumping method, the skew correction with the above-described biting discharge method may be performed.

Next, the control portion 50 causes the ADF motor 52 to normally rotate by a predetermined amount (step S113). In step S113, as illustrated in FIG. 12, the document front end Gf2 is aligned at the reading start position. At this time, the predetermined amount is an amount for positioning the document front end Gf2 at the start position of the reading region Sa.

Note that in step S113, the document detection unit 30 is switched from the ON state to the OFF state as illustrated in the change from FIG. 11 to FIG. 12. That is, the first rotating portion 31 is switched from the second detection posture to the third detection posture.

When the document reading of the second surface proceeds, later, the document rear end Gr2 is separated from the second contact portion 32a, and the second rotating portion 32 returns to the first state (see FIG. 7) from the state illustrated in FIG. 12. Thereafter, when the document rear end Gr2 is separated from the first contact portion 31a, the first rotating portion 31 is switched from the third detection posture to the second detection posture. At this time, the detection target portion 31d is switched from the first open state to the light shielding state, and the document detection unit 30 is switched from the OFF state to the ON state (Yes in step S115).

Note that in a case where the document detection unit 30 is not switched from the OFF state to the ON state even when the ADF motor 52 is rotated by a predetermined amount after the start of the reading of the second surface (No in step S115), it is determined that the jam has occurred, and the process shifts to error processing. Additionally, the predetermined amount in this case can be set as an amount in which a predetermined margin is provided to a rotation amount of the ADF motor 52 required to transport the document of the assumed maximum size, for example.

Thereafter, the control portion 50 causes the ADF motor 52 to normally rotate by a predetermined amount (step S116). In step S116, the document G whose second surface has been read is discharged to the discharge tray 13.

The above configuration is summarized as follows.

The document detection unit 30 includes the first rotating portion 31 having the first contact portion 31a with which the document G can make contact in the first document transport path F1 and rotating along with the contact of the document G to the first contact portion 31a and the separation of the document G from the first contact portion 31a, the second rotating portion 32 having the second contact portion 32a with which the document G can make contact in the second document transport path F2 and rotating along with the contact of the document G to the second contact portion 32a and the separation of the document G from the second contact portion 32a, and the detection portion 33 for detecting the detection target portion 31d provided at the first rotating portion 31.

Additionally, the first rotating portion 31 can make contact with the second rotating portion 32, and by rotating according to the rotation of the second rotating portion 32, switches between the first detection posture (see FIG. 10, for example) in which the first contact portion 31a protrudes to the first document transport path F1 at the first position of the first document transport path F1 and the second detection posture (see FIG. 6, for example) in which the first contact portion 31a protrudes to the first document transport portion F1 at the second position downstream of the first position in the document transport direction.

Therefore, it is possible to detect the document G at two positions in the first document transport path F1 by one first contact portion 31a, and it is possible to suppress the cost increase in comparison with a configuration in which two detection units are individually provided.

Further, in the present embodiment, the first position of the first contact portion 31a is set to the position upstream of the document nip position in the downstream transport roller pair 21, and the second position of the first contact portion 31a is set to the position downstream of the document nip position in the downstream transport roller pair 21. Therefore, when the first rotating portion 31 is in the first detection posture (see FIG. 10, for example), the deflection amount formed on the document G can be appropriately managed when the skew correction of the document G is performed by the downstream transport roller pair 21. In addition, when the first rotating portion 31 is in the second detection posture (see FIG. 6, for example), the document G can be accurately positioned at a predetermined position downstream of the downstream transport roller pair 21, more specifically, at the reading start position.

Note that both the first position and the second position may be set to the position upstream of the document nip position in the downstream transport roller pair 21, or may be set to the position downstream of the document nip position in the downstream transport roller pair 21.

In addition, the first rotating portion 31 is rotatable in the first rotation direction (clockwise direction in the above) and the second rotation direction opposite thereto (counterclockwise direction in the above), and is applied with the force to rotate in the first rotation direction.

Further, the second rotating portion 32 is rotatable in the third rotation direction (clockwise direction in the above) that is a rotation direction when the second contact portion 32a protrudes from the state of retracting with respect to the second document transport path F2, and the fourth rotation direction (counterclockwise direction in the above) that is a rotation direction when the second contact portion 32a retracts from the state of protruding with respect to the second document transport path F2, and is applied with the force to rotate in the third rotation direction.

Additionally, the second rotating portion 32 can take the first state which maintains the first rotating portion 31 in the second detection posture and also allows rotation of the first rotating portion 31 in the second rotation direction in a state in which the second contact portion 32a protrudes into the second document transport path F2 and the document G is not in contact with the first contact portion 31a (see FIG. 6, for example). Further, the second rotating portion 32 can take the second state which allows the first rotating portion 31 to take the first detection posture and also allows rotation of the first rotating portion 31 in the second rotation direction in a state in which the second contact portion 32a retracts from the second document transport path F2 by rotating in the fourth direction from the first state and the document G is not in contact with the first contact portion 31a (see FIG. 10, for example).

That is, by applying a force to rotating in the first rotation direction to the first rotating portion 31 and applying a force to rotate in the fourth rotation direction to the second rotating portion 32, the function of the document detection unit 30 described above can be realized with a simple structure.

Next, in the present embodiment, the detection portion 33 is configured by the optical sensor and includes the light emitting portion 33a for emitting detection light, and the light receiving portion 33b for receiving the detection light. The detection target portion 31d switches between the state in which the detection target portion 31d blocks the optical axis Pd (see FIG. 6, for example), the first open state in which the detection target portion 31d deviates from the optical axis Pd to the upward direction that is the first direction (see FIG. 7, for example), and the second open state in which the detection target portion 31d deviates from the optical axis Pd to the downward direction that is the second direction (see FIG. 10, for example).

Then, while the second rotating portion 32 is in the first state and the first rotating portion 31 is in the second detection posture, the detection target portion 31d is in the light shielding state (see FIG. 6, for example), and the first rotating portion 31 in the second detection posture rotates in the second rotation direction (counterclockwise direction in the above), whereby the detection target portion 31d switches from the light shielding state to the first open state, for example, as illustrated in the change from FIG. 6 to FIG. 7. In addition, while the second rotating portion 32 is in the second state and the first rotating portion 31 is in the first detection posture (see FIG. 10, for example), the detection target portion 31d is in the second open state, and the first rotating portion 31 in the first detection posture rotates in the second rotation direction (counterclockwise direction in the above) as illustrated in the change from FIG. 10 to FIG. 11, whereby the detection target portion 31d is switched from the second open state to the light shielding state.

The control portion 50 can appropriately detect the document G by such movement of the detection target portion 31d.

Further, in the present embodiment, when the second rotating portion 32 is in the first state and the first rotating portion 31 is in the second detection posture in the feed standby state of the document G, the detection target portion 31d is in the light shielding state, and then the feeding of the document G is started, the document front end Gf1 comes into contact with the first contact portion 31a and the first rotating portion 31 is switched from the second detection posture to the third detection posture, and therefore the detection target portion 31d is switched from the light shielding state to the first open state along with this. Next, when the document rear end Gr1 is separated from the first contact portion 31a, the first rotating portion 31 returns from the third detection posture to the second detection posture, and therefore the detection target portion 31d is switched from the first open state to the light shielding state along with this. Next, when the document front end Gf2 entering the second document transport path F2 comes into contact with the second contact portion 32a and the second rotating portion 32 is switched from the first state to the second state, the first rotating portion 31 is switched from the second detection posture to the first detection posture, and therefore the detection target portion 31d is switched from the light shielding state to the second open state along with this. Next, when the document front end Gf2 entering the first document transport path F1 from the second document transport path F2 comes into contact with the first contact portion 31a and the first rotating portion 31 rotates in the second rotation direction (counterclockwise direction in the above) from the first detection posture, the detection target portion 31d is switched from the second open state to the light shielding state along with this.

Thus, when the document front end Gf1 firstly comes into contact with the first contact portion 31a, the first rotating portion 31 is in the second detection posture, so that the document G can be accurately positioned at a predetermined position downstream of the first contact portion 31a, more specifically, at a head alignment position.

Moreover, after that, when the document G enters the first document transport path F1 again passing through the second document transport path F2, the path length of the document G, that is, the length of the path through which the document G has passed, tends to be long, and the position of the document front end Gf2 is hard to manage, so that it is hard to appropriately manage the deflection amount formed on the document G when the skew correction of the document G is performed by the downstream transport roller pair 21. In this case, however, since the first rotating portion 31 is in the first detection posture, the position of the document front end Gf 2 can be accurately grasped, and thus, the deflection amount formed on the document G can be more appropriately managed when the skew correction of the document G is performed by the downstream transport roller pair 21.

Further, in the present embodiment, since the first spring 35 that applies the spring force in the clockwise direction to the first rotating portion 31 and the second spring 36 that applies the spring force in the clockwise direction to the second rotating portion 32 are provided, the configuration in which the rotational force is applied to the first rotating portion 31 and the second rotating portion 32 can be achieved with a simple structure and at a low cost.

Note that in the embodiment described above, when the second rotating portion 32 is in the second state, as illustrated in FIG. 10, the first engagement portion 31b of the first rotating portion 31 is supported by the second engagement portion 32b of the second rotating portion 32, whereby the first detection posture of the first rotating portion 31 is defined. However, when the second rotating portion 32 is in the second state, the first engagement portion 31b of the first rotating portion 31 may not necessarily be supported by the second engagement portion 32b of the second rotating portion 32, and the rotation limit of the first rotating portion 31 in the clockwise direction may be defined by another constituent portion, and the first detection posture of the first rotating portion 31 may be defined.

In addition, it is needless to say that the present disclosure is not limited to each of the embodiments described above, and various modifications are possible within the scope of the disclosure described in the claims, and that they are also included within the scope of the present disclosure.

What is claimed is:

1. A medium transporting apparatus comprising:
   a transport roller pair for nipping and transporting a medium;
   a first medium transport path in which the transport roller pair is provided;
   a second medium transport path for switching back a medium fed downstream in a medium transport direction from the transport roller pair and feeding the medium with a rear end as a front end to an upstream position of the transport roller pair in the first medium transport path; and
   a medium detection unit for detecting passage of a medium in the first medium transport path, wherein
   the medium detection unit includes: a first rotating portion having a first contact portion configured to make contact with a medium in the first medium transport path and rotating along with contact of a medium with the first contact portion and separation of a medium from the first contact portion;
   a second rotating portion having a second contact portion configured to make contact with a medium in the second medium transport path and rotating along with contact of a medium with the second contact portion and separation of a medium from the second contact portion; and
   a detection portion for detecting a detection target portion provided at the first rotating portion, and
   the first rotating portion is configured to make contact with the second rotating portion and is switched, by rotating according to rotation of the second rotating portion, between a first detection posture in which the first contact portion protrudes to the first medium transport path at a first position of the first medium transport path and
   a second detection posture in which the first contact portion protrudes to the first medium transport path at a second position downstream of the first position in a medium transport direction.

2. The medium transporting apparatus according to claim 1, wherein
   the first position is located at a medium transport direction upstream position of a medium nip position in the transport roller pair; and
   the second position is located at a medium transport direction downstream position of the medium nip position.

3. The medium transporting apparatus according to claim 1, wherein
   the first rotating portion is configured to rotate in a first rotation direction that is a rotation direction when switching from the second detection posture to the first detection posture and in a second rotation direction opposite to the first rotation direction, and be applied with a force to rotate in the first rotation direction,
   the second rotating portion is configured to rotate in a third rotation direction that is a rotation direction when the second contact portion protrudes from a state of retracting with respect to the second medium transport path and a fourth rotation direction that is a rotation direction when the second contact portion retracts from a state of protruding with respect to the second medium transport path, and be applied with a force to rotate in the third rotation direction, and the second rotating portion is configured to take a first state which maintains the first rotating portion in the second detection posture and also allows rotation of the first rotating portion in the second rotation direction in a state in which the second contact portion protrudes to the second medium transport path and a medium is not in contact with the first contact portion, and a second state which allows the first rotating portion to take the first detection posture and also allows rotation of the first rotating portion in the second rotation direction in a state in which the second contact portion retracts from the second medium transport path by rotating in the fourth rotation direction from the first state and a medium is not in contact with the first contact portion.

4. The medium transporting apparatus according to claim 3, wherein the detection portion is configured by an optical sensor, the detection target portion switches, along with rotation of the first rotating portion, among a light shielding state in which the detection target portion blocks an optical axis of the optical sensor, a first open state in which the detection target portion deviates from the optical axis to a first direction, and a second open state in which the detection target portion deviates from the optical axis to a second direction, the detection target portion is in the light shielding state while the second rotating portion is in the first state and the first rotating portion is in the second detection posture, the first rotating portion in the second detection posture rotates in the second rotation direction, whereby the detection target portion is switched from the light shielding state to the first open state, the detection target portion is in the second open state while the second rotating portion is in the second state and the first rotating portion is in the first detection posture, and the first rotating portion in the first detection posture rotates in the second rotation direction, whereby the detection target portion is switched from the second open state to the light shielding state.

5. The medium transporting apparatus according to claim 4, further comprising a control portion configured to receive a detection signal from the optical sensor, wherein in a feed standby state of a medium, the second rotating portion is in the first state and the first rotating portion is in the second detection posture, and the detection target portion is in the light shielding state, next, when feeding of a medium is started, a front end of a medium comes into contact with the first contact portion and the first rotating portion is switched from the second detection posture to a third detection posture in which the first contact portion retracts from the first medium transport path, therefore the detection target portion is switched from the light shielding state to the first open state along with this, next, when a rear end of a medium is separated from the first contact portion, the first rotating portion returns from the third detection posture to the second detection posture, therefore the detection target portion is switched from the first open state to the light shielding state along with this, next, when a front end of a medium entering the second medium transport path comes into contact with the second contact portion and the second rotating portion is switched from the first state to the second state, the first rotating portion is switched from the second detection posture to the first detection posture, therefore the detection target portion is switched from the light shielding state to the second open state along with this, and next, when a front end of a medium entering the first medium transport path from the second medium transport path comes into contact with the first contact portion and the first rotating portion rotates in the second rotation direction from the first detection posture, therefore the detection target portion is switched from the second open state to the light shielding state along with this.

6. The medium transporting apparatus according to claim 3, further comprising: a first spring for applying a spring force to the first rotating portion in the first rotation direction; and a second spring for applying a spring force to the second rotating portion in the third rotation direction.

7. An image reading apparatus comprising: a reading unit for reading a medium; and the medium transporting apparatus according to claim 1.

8. The image reading apparatus according to claim 7, wherein a document reading area by the reading unit is positioned downstream in a medium transport direction with respect to the second position of the first contact portion.

9. A medium transporting apparatus comprising:

a transport roller pair for nipping and transporting a medium;

a first medium transport path in which the transport roller pair is provided;

a second medium transport path for switching back a medium fed downstream in a medium transport direction from the transport roller pair and feeding the medium with a rear end of the medium as a front end to an upstream position of the transport roller pair in the first medium transport path; and one medium detection unit for detecting passage of a medium in the first medium transport path, wherein a position at which the medium detection unit detects a medium is switched between a transport direction upstream position and a transport direction downstream position of the transport roller pair according to whether or not a medium is transported on the second medium transport path.

10. The medium transporting apparatus according to claim 9, wherein the medium detection unit detects a medium at a transport direction downstream position of a medium nip position of the transport roller pair in a state in which a medium is not transported to the second medium transport path, and detects a medium at a transport direction upstream position of a medium nip position of the transport roller pair in a state in which a medium is transported to the second medium transport path.

* * * * *